US012676035B2

(12) United States Patent
Jeon et al.

(10) Patent No.: US 12,676,035 B2
(45) Date of Patent: Jul. 7, 2026

(54) ACCESS CARD PROVIDING METHOD, ACCESS CARD CHECKING METHOD, AND APPARATUS FOR PERFORMING SAME METHODS

(71) Applicant: KAKAO CORP., Jeju-si (KR)

(72) Inventors: Hyeon Su Jeon, Seongnam-si (KR); Jae Ho Kim, Seongnam-si (KR); Jeong Ho Kim, Seongnam-si (KR); Seung Hyun Ko, Seongnam-si (KR); Geun Tak Han, Seongnam-si (KR); Na Yeong Hong, Seongnam-si (KR); Seung Yeop Yeom, Seongnam-si (KR); Ji Hyun Kim, Seongnam-si (KR)

(73) Assignee: KAKAO CORP., Jeju-si (KR)

( * ) Notice: Subject to any disclaimer, the term of this patent is extended or adjusted under 35 U.S.C. 154(b) by 144 days.

(21) Appl. No.: 18/562,288

(22) PCT Filed: May 17, 2022

(86) PCT No.: PCT/KR2022/007056

§ 371 (c)(1),
(2) Date: Nov. 17, 2023

(87) PCT Pub. No.: WO2022/245106

PCT Pub. Date: Nov. 24, 2022

(65) Prior Publication Data

US 2024/0242551 A1 Jul. 18, 2024

(30) Foreign Application Priority Data

May 17, 2021 (KR) ........................ 10-2021-0063495
May 18, 2021 (KR) ........................ 10-2021-0063957

(51) Int. Cl.
*G07C 9/27* (2020.01)
*G07C 9/00* (2020.01)

(52) U.S. Cl.
CPC ..... *G07C 9/00309* (2013.01); *G07C 9/00571* (2013.01)

(58) Field of Classification Search
CPC .. G07C 9/00309; G07C 9/00571; G07C 9/00; G07C 9/29; G06Q 20/3823; G06Q 20/40; H04W 12/08
See application file for complete search history.

(56) References Cited

U.S. PATENT DOCUMENTS 9,311,640 B2 4/2016 Filler
2014/0018136 A1* 1/2014 Sai .................... G06Q 30/0209 463/11

(Continued)

FOREIGN PATENT DOCUMENTS

KR 10-2002-0059987 A 7/2002
KR 10-2009-0012546 A 2/2009

(Continued)

*Primary Examiner* — Vernal U Brown
(74) *Attorney, Agent, or Firm* — Seed Intellectual Property Law Group LLP

(57) ABSTRACT

An access card providing method, an access card checking method, and an apparatus for performing the methods are disclosed. An access card providing method may comprise producing a virtual access card by a partner terminal desiring to produce the access card, which allows entering of an online or offline area of a partner, wherein the access card is provided through an application of a user terminal. An access card checking method may comprise, when a user terminal having issued an access card to an offline area of a partner recognizes identification information, identifying whether an access card corresponding to the identification information has been issued so as to check the access card.

20 Claims, 16 Drawing Sheets

(56) References Cited

U.S. PATENT DOCUMENTS

| | | | | |
|---|---|---|---|---|
| 2019/0349770 | A1* | 11/2019 | Andres | G06Q 20/027 |
| 2021/0256785 | A1* | 8/2021 | Kanteti | H04W 52/0254 |
| 2022/0141215 | A1* | 5/2022 | Kwok | H04L 63/0853<br>726/6 |

FOREIGN PATENT DOCUMENTS

| | | | |
|---|---|---|---|
| KR | 10-2010-0127459 | A | 12/2010 |
| KR | 10-2011-0133142 | A | 12/2011 |
| KR | 10-2014-0088005 | A | 7/2014 |
| KR | 10-2016-0050841 | A | 5/2016 |
| KR | 101673189 | B1 | 11/2016 |
| KR | 10-2017-0047817 | A | 5/2017 |
| KR | 10-2017-0123964 | A | 11/2017 |
| KR | 10-2018-0054325 | A | 5/2018 |
| KR | 10-2018-0130219 | A | 12/2018 |
| KR | 10-2019-0070219 | A | 6/2019 |
| KR | 102169082 | B1 | 10/2020 |

* cited by examiner

ACCESS CARD PROVIDING METHOD, ACCESS CARD CHECKING METHOD, AND APPARATUS FOR PERFORMING SAME METHODS

BACKGROUND

Technical Field

The present disclosure relates to an access card providing method, an access card checking method, and an apparatus for performing the methods.

Description of the Related Art

Users engage in various activities through online and offline areas. For example, a user enters the office to go to work at 9 a.m. by tagging an employee identification (ID) card, goes to the gym to do workout at 12 p.m. by presenting a membership card as a member of the gym, purchases a ticket on an online website at 6 p.m., chats with friends on a chatroom at 7 p.m., and passes through the entrance of an apartment to get home at 9 p.m. by tagging an access card on the entrance.

At this time, when the user logs in from an online area or enters in an offline area, there may be a need for access only when the user has particular qualifications. There is a need for a method for a user to collectively manage qualifications for access required for various online or offline activities through a user terminal.

Also, specific measures are required for how to utilize such qualifications for the access.

BRIEF SUMMARY

Technical Goals

The present disclosure provides a method and apparatus for a user to more easily and conveniently issue and manage an access card required for online and offline access through an application.

The present disclosure provides a method and apparatus for accessing a particular online or offline area related to a partner through an access card required to access the area by managing an access card generated by the partner through an application installed on a user terminal.

The present disclosure provides a method and apparatus for checking an access card for access an online or offline area related to a partner using the access card.

Technical Solutions

An access card providing method performed by an access card management server according to an embodiment of the disclosure includes receiving card information for producing an access card from a partner terminal, producing the access card based on the received card information, generating a link or a code to a card issuance page for the access card, receiving an issuance request for the access card of a user terminal through the link or the code, and providing data for the produced access card in response to the issuance request for the access card. The access card is a virtual card indicating qualifications to enter an online area or an offline area set by the partner terminal, and the user terminal is configured to receive different types of access cards produced by different partner terminals.

The access card may be assigned with user information of a user terminal designated by the partner terminal, and the user information may include a phone number of the user terminal or a user account of the user terminal.

The access card may be assigned with user information related to a user terminal, for which issuance is requested within a number of access cards that are able to be issued, designated by the partner terminal, and the user information may include a phone number of the user terminal or a user account of the user terminal.

The access card may have set validity conditions, and the validity conditions may include at least one of time information, type information, profile information, or verification information related to the access card.

When a partner corresponding to the partner terminal that produces the access card is expanded according to a hierarchical structure, the access card may be generated based on the hierarchical structure.

An instant message related to production of the access card may include (i) an instant message including a notification that the production of the access card is completed or (ii) an instant message including information on the access card, and the instant message may be provided to the partner terminal through a chatroom identified as a business entity corresponding to the partner terminal or an access card production server.

The instant message related to issuance of the access card may include an instant message including a notification that the issuance of the access card is completed, and the instant message may be provided to the partner terminal or the user terminal through a chatroom identified as a business entity corresponding to the partner terminal or an access card issuance server.

An access card checking method performed by an access card management server according to an embodiment of the disclosure includes providing identification information corresponding to an access card to the access card checking server, receiving, from the access card checking server, an inquiry whether the access card is issued for a user terminal that recognizes the identification information, confirming whether the access card corresponding to the identification information is issued, and transmitting, to the access card checking server, a result of confirming whether the access card for the user terminal is issued. The identification information is posted in an offline area by the access card checking server for entry to the offline area, and the access card is a virtual card indicating qualifications to enter the offline area.

Access processing for the access card may be performed according to (i) whether the user terminal has validly received the access card, or (ii) whether the access card issued for the user terminal satisfies validity conditions.

Whether the user terminal has validly received the access card may be determined according to whether at least one of access cards issued for the user terminal includes an access card related to qualifications to enter the offline area.

The access card checking method may further include setting additional information including at least one of a type of the access card, authority set in the access card, a validity period for recognizing the identification information, a page that is confirmed by a user terminal after recognizing the identification information, a page that is confirmed by a user terminal not holding an access card after recognizing the identification information, whether the identification information is scanned in a duplicated manner, or a page that is confirmed by a user terminal that scans the identification information in a duplicated manner when scanning in a duplicated manner is prohibited.

A message including a notification related to completion of checking for the access card may be provided through a chatroom, and the chatroom may be identified as a business entity of the partner terminal or the access card management server.

The access card checking method may further include providing check information for the access card to a partner terminal.

The check information may include at least one of a time point at which the user terminal recognizes the identification information and requests to check the access card, whether the access card is checked in a duplicated manner, user information for the user terminal checked through the access card, or information on the access card that is requested to be checked.

According to an embodiment, an access card checking method performed by an access card checking server includes recording check information related to recognition of identification information corresponding to an access card of a user terminal, transmitting, to an access card management server, an inquiry whether the access card is issued for the user terminal that recognizes the identification information, receiving, from the access card management server, a result of confirming whether the access card is issued based on the identification information, and performing access processing based on the result of confirming. The identification information is posted in an offline area by the access card checking server to enter the offline area, and the access card is a virtual card indicating qualifications to enter the offline area.

The performing of the access processing may include performing the access processing according to (i) whether the user terminal has validly received the access card, or (ii) whether the access card issued for the user terminal satisfies validity conditions.

Whether the user terminal has validly received the access card may be determined according to whether at least one of access cards issued for the user terminal includes an access card related to qualifications to enter the offline area.

A message including a notification related to completion of checking for the access card may be provided through a chatroom, and the chatroom may be identified as a business entity of the partner terminal or the access card management server.

The access card checking method may further include providing check information for the access card to the access card management server.

The check information may include at least one of a time point at which the user terminal recognizes the identification information and requests to check the access card, whether the access card is checked in a duplicated manner, information on the user terminal, or information on the access card requested to be checked.

According to an embodiment, an access card checking method performed by a user terminal includes recognizing identification information corresponding to an access card, and receiving a message indicating that checking is completed based on the access card according to whether the access card is issued. The identification information is posted in an offline area by the access card checking server to enter the offline area, the access card is a virtual card indicating qualifications to enter the offline area, and access processing for the access card is performed according to whether the access card for the user terminal is issued based on the identification information.

According to an embodiment, an access card management system comprising one or more memories configured to collectively store instructions; and one or more processors configured to collectively execute the instructions to: receive card information for producing an access card from a partner terminal; produce the access card based on the received card information; generate a link or a code to a card issuance page for the access card; receive an issuance request for the access card of a user terminal through the link or the code; and provide data for the produced access card in response to the issuance request for the access card, wherein the access card is a virtual card indicating qualifications to enter an online area or an offline area set by the partner terminal, and wherein the user terminal is configured to receive different types of access cards produced by different partner terminals.

Effects

According to an embodiment of the present disclosure, an access card required for a user to access online or offline may be more easily and conveniently managed through an application.

According to an embodiment of the present disclosure, a particular online or offline area related to a partner may be accessed through an access card required to access the area by managing access cards issued by a plurality of partners through an application.

According to an embodiment of the present disclosure, it is possible to access an online or offline area related to a partner by checking an access card in various ways.

DETAILED DESCRIPTION

Figure 1:
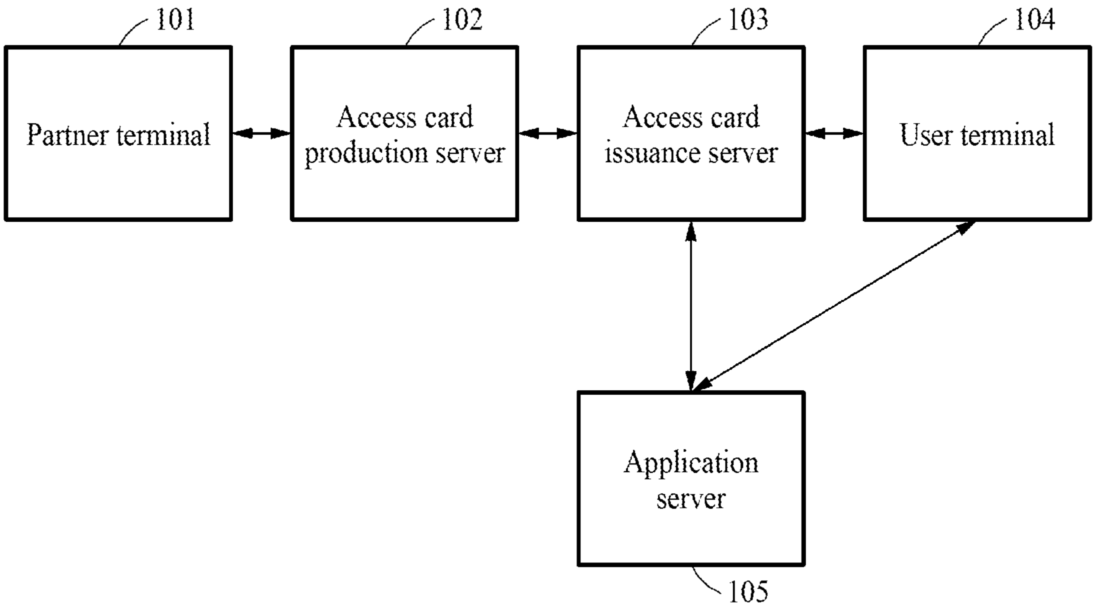
FIG. 1 is a diagram illustrating operations of apparatuses for performing a method of providing an access card according to a first embodiment of the present disclosure.

Hereinafter, embodiments will be described in detail with reference to the accompanying drawings. The scope of the right, however, should not be construed as limited to the embodiments set forth herein. In the drawings, like reference numerals are used for like elements.

Various modifications may be made to the embodiments. Here, the embodiments are not construed as limited to the disclosure and should be understood to include all changes, equivalents, and replacements within the idea and the technical scope of the disclosure.

Although terms of "first" or "second" are used to explain various components, the components are not limited to the terms. These terms should be used only to distinguish one component from another component. For example, a first component may be referred to as a second component, and similarly the second component may also be referred to as the first component.

The terminology used herein is for the purpose of describing particular embodiments only and is not to be limiting of the embodiments. As used herein, the singular forms "a," "an,", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the embodiments with reference to the accompanying drawings, like reference numerals refer to like constituent elements and a repeated description related thereto will be omitted. In the description of embodiments, detailed description of well-known related structures or functions will be omitted when it is deemed that such description will cause ambiguous interpretation of the present disclosure.

Hereinafter, embodiments will be described in detail with reference to the accompanying drawings.

FIG. 1 is a diagram illustrating operations of apparatuses for performing a method of providing an access card according to a first embodiment of the present disclosure.

FIG. 1 shows a partner terminal 101, an access card production server 102, an access card issuance server 103, a user terminal 104, and an application server 105. The partner terminal 101 may produce an access card through the access card production server 102 for online or offline access of a user holding the user terminal 104. The production of the access card may be performed through an access card production page provided by the access card production server 102.

The access card may be provided to the user terminal 104 that has accessed an access card issuance page provided by the access card issuance server 103. Alternatively, the access card may be provided through an application linked to the access card issuance server 103. In this case, the application may be installed on the user terminal 104 to operate in association with the application server 105, and provide a link or menu so that the user terminal 104 may access the access card issuance page.

According to an embodiment of the present disclosure, the partner terminal 101 may provide, to the user terminal 104, an access card which is a virtual card corresponding to a valid identity, qualification, company, school, membership, access card, warranty card, business card, ticket, and admission ticket, without the use of offline means for the user terminal 104.

In FIG. 1, the access card production server 102, the access card issuance server 103, and the application server 105 may be operated by the same business entity or by different business entities.

An access card may refer to a virtual card including information on qualifications to enter a particular online area (e.g., a website or application) related to a partner through login or to enter a particular offline space (e.g., a building) related to a partner. The access card may refer to a virtual card that allows the user terminal 104 to access or enter an online or offline area related to the partner.

In other words, the access card may be a digitized virtual card of an online or offline valid identity, qualification, company, school, membership, access card, warranty card, business card, ticket, or admission ticket. The partner terminal 101 may produce an access card which is a virtual card that digitizes and represents identity, rights, qualifications, ownership, or authority to enter, confirmed online or offline in a cloud type service.

The access cards may be divided into various types. For example, the access card may be a card used to prove identity or affiliation related to a partner, such as a student identification (ID) card, employee ID card, membership card, business card, or ID card. Alternatively, the access card may be an admission ticket to watch a performance, exhibition, or game related to the partner taking place at a particular time. The access card may be a membership, season ticket, or the like related to the partner that may be used in a particular period. Alternatively, the access card may refer to a card to enter a building designated by the partner, or may be information for authentication of purchase/possession of products or services related to the partner, such as a warranty. The access card described above refers to information that may prove whether the user has permission to access an online or offline area related to the partner, and is not limited to the examples described above.

For example, in order for the user to enter a chatroom generated by the partner, the user terminal 104 may receive an access card, which is permission to enter the chatroom through the card issuance page of the access card issuance server 103. In another example, in order for the user to visit a particular space (office) of the partner, the user terminal 104 may receive an access card, which is permission to enter the office through the card issuance page of the access card issuance server 103. The access card issued through the card issuance page of the access card issuance server 103 may be stored in at least one of the access card production server 102, the access card issuance server 103, the application server 105, or the user terminal 104.

The access card production server 102 may provide an access card production page, which is an interface through which the partner terminal 101, that wishes to produce an access card, may sign up, register, and then produce an access card. The access card issuance server 103 may provide an access card issuance page, which is an interface through which the user terminal 104, that wishes to receive an access card, may access and receive the access card. The user terminal 104 may access the access card issuance page through an application provided by the application server 105 and transmit a request for issuance of an access card. After the access card is issued, the user terminal 104 may manage the access card through the application. In an example, the application may be a messenger application.

As an access check device (not shown) connected to the partner terminal 101 checks whether the access card exists for the user terminal 104, the user may enter a particular offline space related to the partner. The user terminal 104 and the access check device may use a short-range wireless method (e.g., Bluetooth, near-field communication (NFC), etc.), the access check device may recognize identification information (e.g., a quick-response (QR) code) displayed on the user terminal 104, or the user terminal 104 may recognize identification information displayed on the access check device, to check whether the access card exists in the application installed on the user terminal 104.

According to an embodiment of the present disclosure, the access card required for various online and offline activities of the user is managed through the application installed on the user terminal 104, and accordingly, the access card may be conveniently accessed by the user terminal 104.

Figure 2:
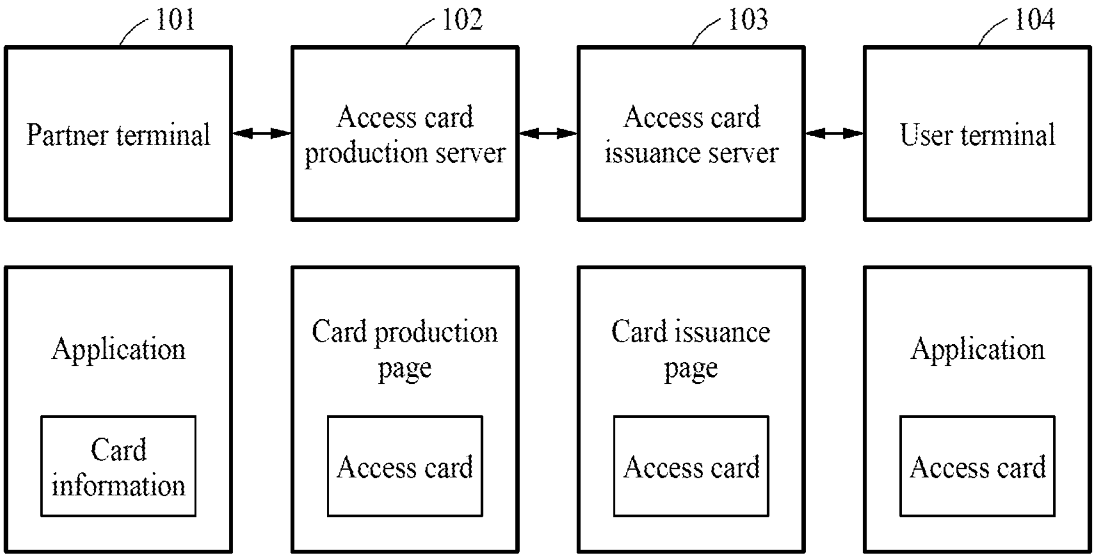
FIG. 2 is a diagram illustrating a process of providing an access card according to the first embodiment of the present disclosure.

FIG. 2 is a diagram illustrating a process of providing an access card according to the first embodiment of the present disclosure.

FIG. 2 shows a process in which an access card produced by the partner terminal 101 in the access card production server 102 is issued to the user terminal 104 that has accessed the access card issuance server 103.

The partner terminal 101 related to the partner may register the partner on the card production page provided by the access card production server 102, and produce an access card related to the partner. The card production page may provide an interface through which information on a partner is registered and the partner terminal 101 may input card information expressed as an image or a text to produce an access card.

The partner terminal 101 may use an application installed on the partner terminal 101 to access the card production page. The partner terminal 101 may produce an access card by inputting the card information for producing the access card to the card production page. The card information will be described in detail with reference to FIG. 8.

When the production of the access card is completed in the access card production server 102, an instant message including a notification that the production of the access card is completed or information on the access card produced based on the card information may be provided to the partner terminal 101 through a messenger application. In this case, the message may be provided through a chatroom identified as a business entity corresponding to the partner terminal 101 or a chatroom identified as a business entity corresponding to the access card production server 102. A chatroom identified as a business entity may be expressed by a business entity's name or icon.

The access card produced by the access card production server 102 may be provided to the user terminal 104 through the card issuance page provided by the access card issuance server 103. The card issuance page is accessible through a link (a Uniform Resource Locator (URL)) or a QR code. The link or the QR code for accessing the card issuance page may be provided to the user terminal 104 directly by the partner terminal 101, or may be provided to the user terminal 104 through the access card production server 102 or the access card issuance server 103.

The user terminal 104 may access the card issuance page through the link or the QR code for accessing the card issuance page, and receive the access card issued on the card issuance page through an application. A message notifying whether the access card is issued may be provided to the partner terminal 101 through an application.

When the issuance of the access card is completed by the access card issuance server 103, an instant message including a notification that the issuance of the access card is completed may be provided to the partner terminal 101 or the user terminal 104 through a messenger application. In this case, the message may be provided through a chatroom identified as a business entity corresponding to the partner terminal 101 or a chatroom identified as a business entity corresponding to the access card issuance server 103. A chatroom identified as a business entity may be expressed by a business entity's name or icon.

The access card may be generated in response to user information. The user information is information for identifying a user and may include a phone number of the user terminal 104 or account information (ID) of an application installed on the user terminal 104.

The access card may be stored in an application installed on the user terminal 104, or may be stored in the access card issuance server 103 rather than the user terminal 104, and the user terminal 104 may check it through the application.

The access card may be stored by various methods. In an example, when the access card is produced by the access card production server 102, the access card may be stored in a secure storage area of the access card production server 102 or the access card issuance server 103. In this case, the consent of the user terminal 104 may be required for the access card to be stored in the secure storage area of the access card production server 102 or the access card issuance server 103. In this case, the access card may not be stored in the user terminal 104, and a list of access cards issued to the partner may be provided through an application installed on the user terminal 104. After that, when a particular area of the partner is accessed online or offline through the user terminal 104, the user terminal 104 may download the access card from the secure storage area of the access card production server 102 or the access card issuance server 103 and store the access card. Alternatively, when a specific area of the partner is accessed online or offline through the user terminal 104, the access card may not be downloaded to the user terminal 104, and it may be confirmed whether the access card stored in the secure storage area of the access card production server 102 or the access card issuance server 103 exists through the user information corresponding to the access card.

In another example, when the access card is generated by the access card production server 102, the access card may be downloaded to the user terminal 104 and managed through an application. That is, the access card may be encrypted and stored in a storage area of the user terminal 104. When a particular area of the partner is accessed online or offline through the user terminal 104, it may be confirmed whether the access card exists by decrypting the encrypted access card through a certificate of the user terminal 104.

Figure 3:
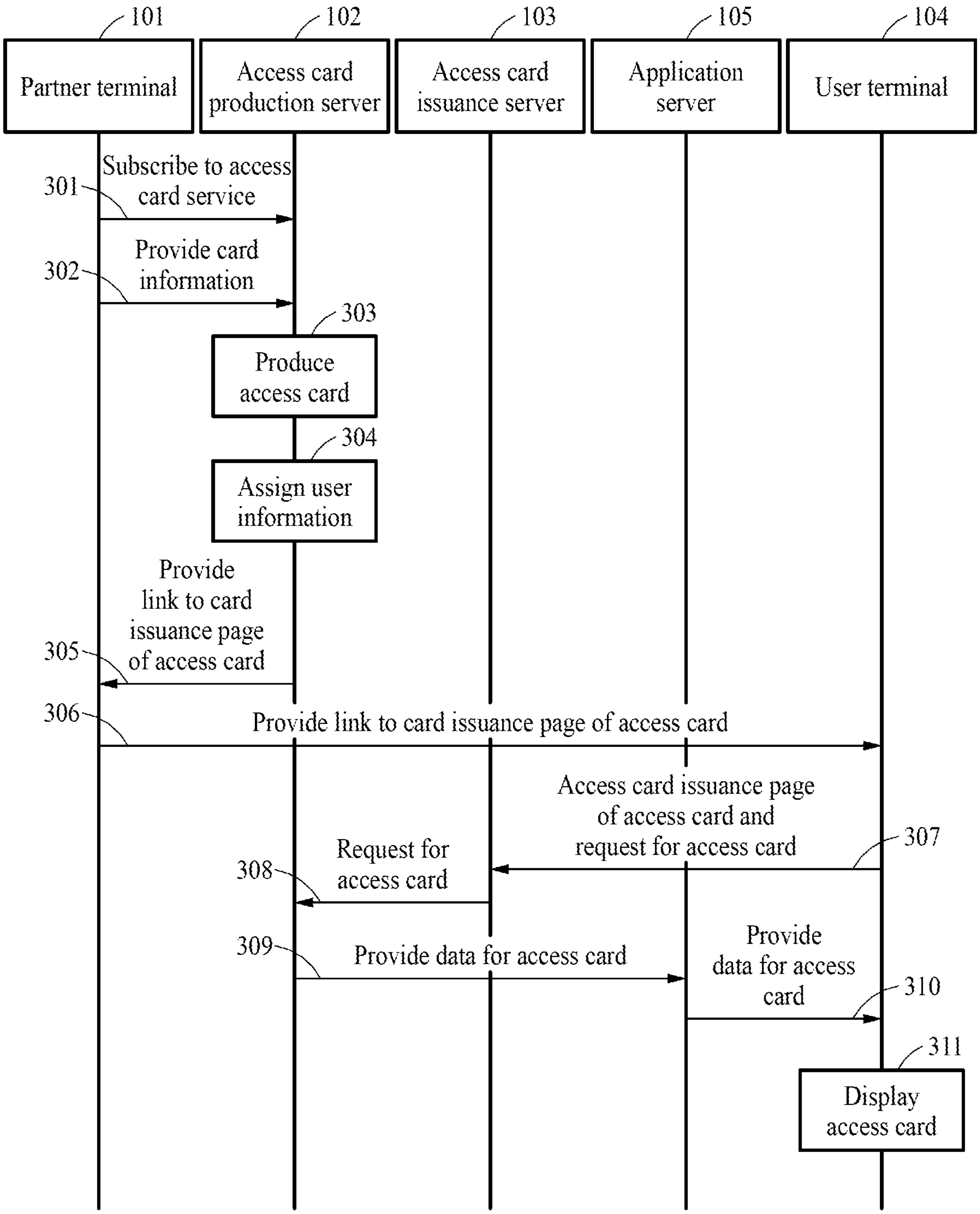
FIG. 3 is a flowchart illustrating a process of performing a method of providing an access card according to the first embodiment of the present disclosure.

FIG. 3 is a flowchart illustrating a process of performing a method of providing an access card according to the first embodiment of the present disclosure.

In operation 301, the partner terminal 101 may subscribe to an access card service through a partner management page provided by the access card production server 102. Information input when subscribing to the access card service will be described in detail with reference to FIG. 7.

In operation 302, the partner terminal 101 may provide card information to a card production page provided by the access card production server 102. The card information will be described in detail with reference to FIG. 8.

In operation 303, the access card production server 102 may produce an access card based on the card information input by the partner terminal 101. The card information transmitted to or registered in the access card production server 102 by the partner terminal 101 to produce an access card will be described in more detail with reference to FIG. 8.

In operation 304, the access card production server 102 may assign user information of the user terminal 104 to the access card. For example, when the access card is issued limitedly to a particular user terminal 104, the user information may be assigned to the access card. Although not shown in FIG. 3, when the user terminal 104 to which the access card is issued is not designated, the number of access cards that may be issued may be assigned to the access card on a first-come, first-served basis.

In operation 305, the access card production server 102 may provide a link to the card issuance page for the access card to the partner terminal 101.

In operation 306, the partner terminal 101 may provide a link to the card issuance page of the access card to the user terminal 104.

In operation 307, the user terminal 104 may access the card issuance page of the access card and request for the issuance of the access card to the access card issuance server 103.

In operation 308, the access card issuance server 103 may request for the access card to the access card production server 102.

In operation 309, the access card production server 102 may provide data for the access card to the application server 105. An actually produced access card may be stored in the access card production server 102, and the data for the access card required to display the access card may be provided to the application server 105.

In operation 310, the application server 105 may provide the data for the access card to the user terminal 104.

In operation 311, the user terminal 104 may display the access card through an application using the data for the access card.

Figure 4:
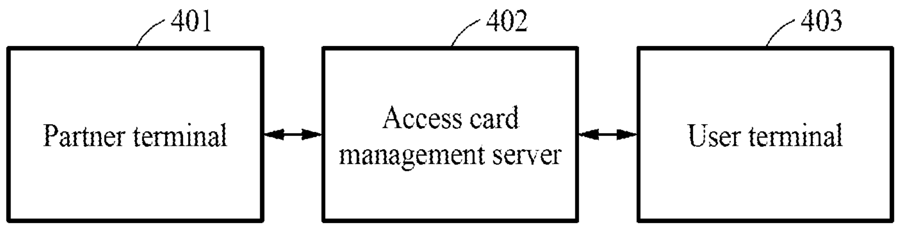
FIG. 4 is a diagram illustrating operations of apparatuses for performing a method of providing an access card according to a second embodiment of the present disclosure.

FIG. 4 is a diagram illustrating operations of apparatuses for performing a method of providing an access card according to a second embodiment of the present disclosure.

FIG. 4 shows a case where the access card production server 102, the access card issuance server 103, and the application server 105 described with reference to FIG. 1 are implemented through an access card management server 402, which is one server. The access card management server 402 may perform the same operations as those of the access card production server 102, the access card issuance server 103, and the application server 105. An operation of a partner terminal 401 may be the same as the operation of the partner terminal 101, and an operation of a user terminal 403 may be the same as the operation of the user terminal 104.

The partner terminal 401 may produce an access card through the access card management server 402 for online or offline access of a user holding the user terminal 403. The production of the access card may be performed through an access card production page provided by the access card management server 402. The access card may be provided to the user terminal 403 that has accessed an access card issuance page provided by the access card management server 402 through an application.

Figure 5:
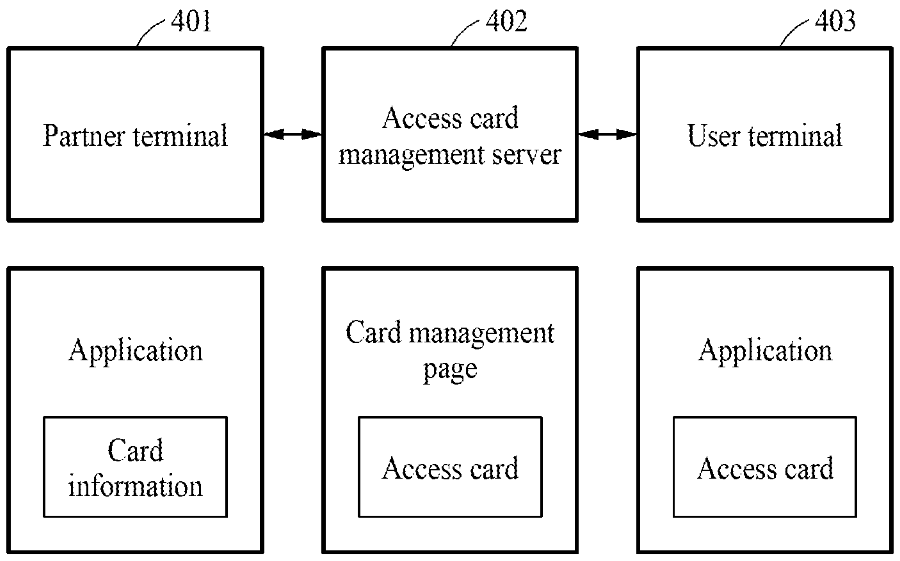
FIG. 5 is a diagram illustrating a process of providing an access card according to the second embodiment of the present disclosure.

FIG. 5 is a diagram illustrating a process of providing an access card according to the second embodiment of the present disclosure.

Specifically, FIG. 5 shows a process in which an access card produced by the partner terminal 401 in the access card management server 402 is issued to the user terminal 403 that has accessed the access card management server 402.

The partner terminal 401 related to a partner may register the partner on the card production page provided by the access card management server 402, and produce an access card related to the partner. The card production page may provide an interface through which information on a partner is registered and the partner terminal 401 may input card information expressed as an image or a text to produce an access card. The card information transmitted to or registered in the access card management server 402 by the partner terminal 401 to produce an access card will be described in more detail with reference to FIG. 8.

The partner terminal 401 may use an application installed on the partner terminal 401 to access the card production page. The partner terminal 401 may produce an access card by inputting the card information for producing the access card to the card production page.

When the production of the access card is completed in the access card management server 402, an instant message including a notification that the production of the access card is completed or information on the access card produced based on the card information may be provided to the partner terminal 401 through a messenger application. In this case, the message may be provided through a chatroom identified as a business entity corresponding to the partner terminal 401 or a chatroom identified as a business entity corresponding to the access card management server 402. A chatroom identified as a business entity may be expressed by a business entity's name or icon.

The access card produced by the access card management server 402 may be provided to the user terminal 403 through the card issuance page. The user terminal 403 may access the card issuance page through a link (URL) or a QR code. The link or the QR code for accessing the card issuance page may be provided to the user terminal 403 directly by the partner terminal 401, or may be provided to the user terminal 403 through the access card management server 402.

The user terminal 403 may access the card issuance page through the link or the QR code for accessing the card issuance page, and receive the access card issued on the card issuance page through an application. A message notifying whether the access card is issued may be provided to the partner terminal 401 through an application.

When the issuance of the access card is completed by the access card management server 402, an instant message including a notification that the issuance of the access card is completed may be provided to the partner terminal 401 or the user terminal 403 through a messenger application. In this case, the message may be provided through a chatroom identified as a business entity corresponding to the partner terminal 401 or a chatroom identified as a business entity corresponding to the access card management server 402. A chatroom identified as a business entity may be expressed by a business entity's name or icon.

When the access card is generated, user information may be assigned to the access card. The user information is information for identifying a user and may include a phone number of the user terminal 403, account information (ID) of an application installed on the user terminal 403, or identification information (employment number/student number, etc.) of another user.

The access card may be stored in an application installed on the user terminal 403, or may be stored in the access card management server 402 rather than the user terminal 403, and the user terminal 403 may check it through the application.

Figure 6:
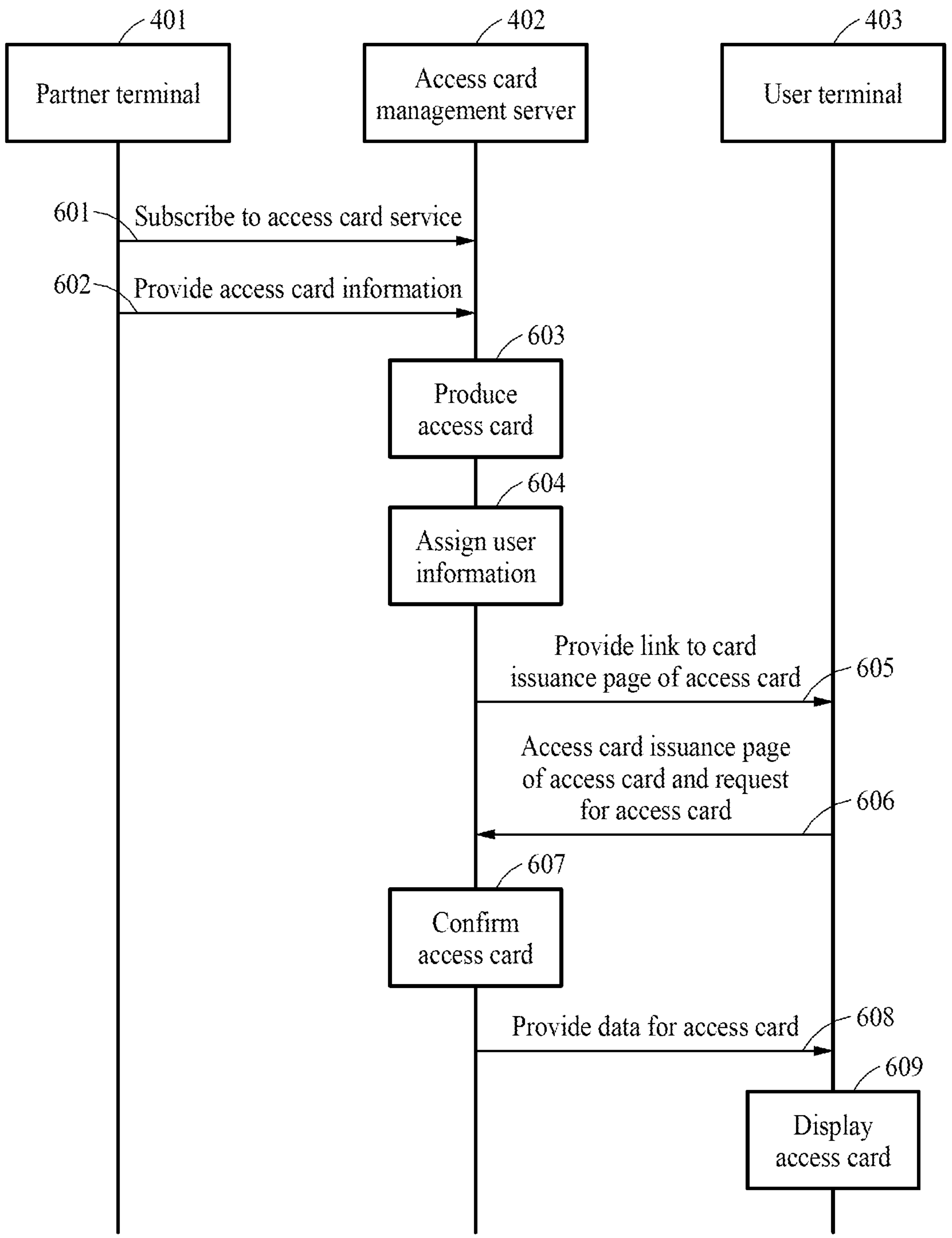
FIG. 6 is a flowchart illustrating a process of performing a method of providing an access card according to the second embodiment of the present disclosure.

FIG. 6 is a flowchart illustrating a process of performing a method of providing an access card according to the second embodiment of the present disclosure.

In operation 601, the partner terminal 401 may subscribe to an access card service through a partner management page provided by the access card management server 402. Information input when subscribing to the access card service will be described in detail with reference to FIG. 7.

In operation 602, the partner terminal 401 may provide card information to a card production page provided by the access card management server 402. The card information will be described in detail with reference to FIG. 8.

In operation 603, the access card management server 402 may produce an access card based on the card information input by the partner terminal 401.

In operation 604, the access card management server 402 may assign user information of the user terminal 403 to the access card. For example, when the access card is issued limitedly to a particular user terminal 403, the user information may be assigned to the access card. Although not shown in FIG. 6, when the user terminal 403 to which the access card is issued is not designated, the number of access cards that may be issued may be assigned to the access card on a first-come, first-served basis.

In operation 605, the access card management server 402 may provide a link to the card issuance page for the access card to the user terminal 403.

In operation 606, the user terminal 403 may access the card issuance page of the access card and request for the issuance of the access card to the access card management server 402.

In operation 607, the access card management server 402 may confirm the access card requested to be issued by the user terminal 403.

In operation 608, the access card management server 402 may provide data for the access card to the user terminal 403. An actually produced access card may be stored in the access card management server 402, and the data for the access card required to display the access card may be provided to the user terminal 403. Alternatively, the data for the access card may be stored in the user terminal 403.

In operation 609, the user terminal 403 may display the access card through an application using the data for the access card.

A partner management page and a card production page to be described with reference to FIGS. 7 to 14 may be provided by the access card production server 102 or the access card management server 402. Also, a card issuance page may be provided by the access card issuance server 103 or the access card management server 402. The partner terminal 101 and the user terminal 104 will be described with reference to FIGS. 7 to 14.

Figure 7:
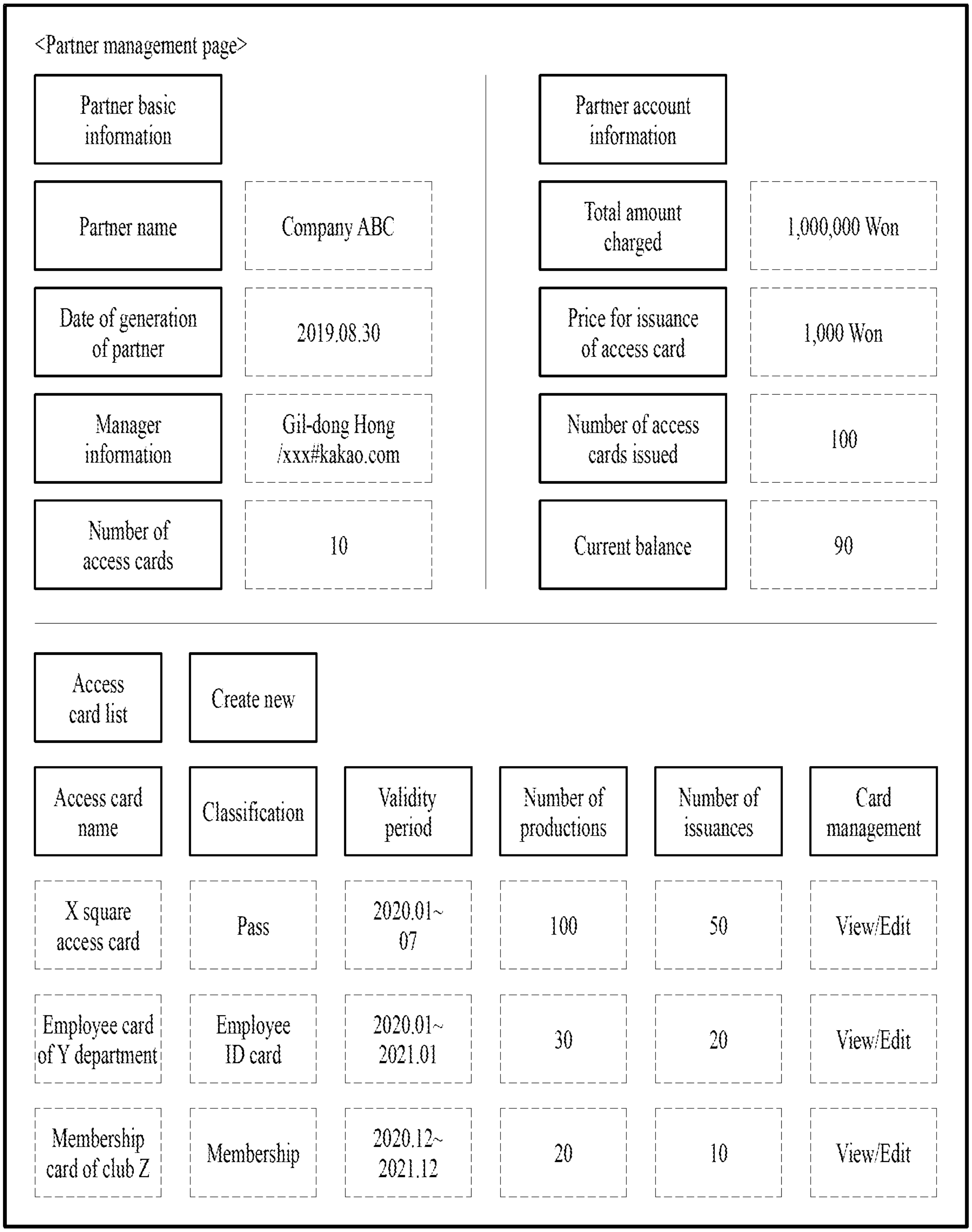
FIG. 7 is a diagram illustrating a partner management page accessed by a partner terminal according to an embodiment of the present disclosure.

FIG. 7 is a diagram illustrating a partner management page accessed by a partner terminal according to an embodiment of the present disclosure.

The partner management page shown in FIG. 7 may refer to a page for the partner terminal 101 to sign up to produce an access card or to manage the access card after signing up.

The partner terminal 101 may register a name of a partner and administrator information to produce an access card. According to an embodiment of the present disclosure, the issuance of an access card may charge a fee. Account information for the partner may be set for the charging. The account information may include a recharge amount, price for the issuance of an access card, the number of access cards issued, current balance, and the like. The recharge amount refers to the amount the partner recharges to issue an access card. The price for the issuance of an access card may refer to the amount consumed each time one access card is issued. The price for the issuance of an access card may vary depending on the type of the access card and the number of access cards issued. The current balance may refer to the amount obtained by subtracting an amount obtained by multiplying the price for the issuance of an access card by the number of access cards issued, from the recharge amount.

An access card list refers to a list of access cards produced by the partner terminal 101. The access card list may provide a menu for viewing or editing classification of the access cards, a validity period, the number of productions, the number of issuances, and details of the access card.

Each item shown in FIG. 7 is merely an example, and items related to the access card may be further added.

Figure 8:
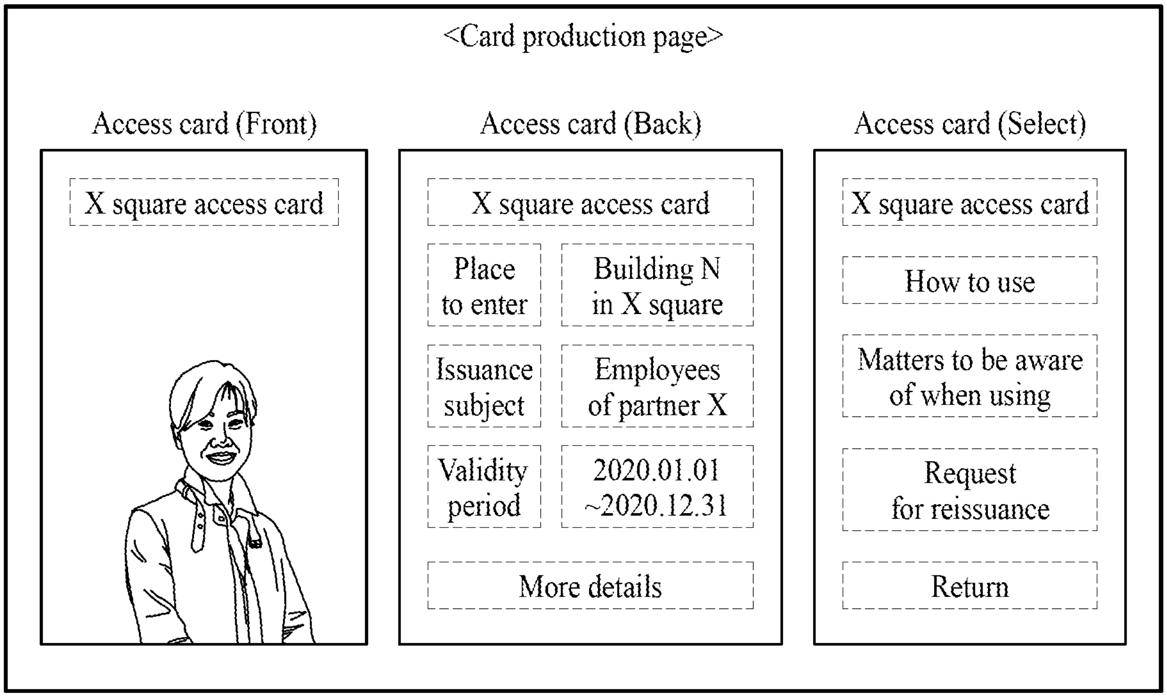
FIG. 8 is a diagram illustrating a card production page accessed by a partner terminal according to an embodiment of the present disclosure.

FIG. 8 is a diagram illustrating a card production page accessed by a partner terminal according to an embodiment of the present disclosure.

FIG. 8 shows a card production page provided by the access card production server 102 or the access card management server 402. Hereinafter, an operation between the partner terminal 101 and the access card production server 102 will be described, and the following descriptions may also be applied to an operation between the partner terminal 401 and the access card management server 402 in the same manner. The card production page of FIG. 8 is a page accessible by the partner terminal 101, and may be set for each access card that the partner terminal 101 wishes to produce. An interface for producing an access card is not limited to FIG. 8.

For example, card information input or registered by the partner terminal 101 to produce an access card may be produced based on at least one of pieces of information. The card information described below is an example, and the present disclosure is not limited thereto.

(1) Issuance subject information for an access card (e.g., a phone number of the user terminal 104, an application ID of the user terminal 104, personal identification information related to a user of the user terminal 104 (e.g., student number or employee number))

(2) Issuance number information for an access card (the issuance number information may be set when there is no issuance subject information for the user terminal 104)

(3) Application identification information of a business entity corresponding to the partner terminal 101 (e.g., identification information (ID) for an official account related to the business entity of the partner terminal 101 in a messenger application)

(4) Information on the partner terminal 101 which is an access terminal (5) Type of access card (e.g., a pass, student ID card, membership card, etc.), (6) Validity period information of an access card (7) Whether an access card is retrievable, or whether an access card is transferable/retransferable (8) Store where an access card may be used (e.g., in a case of a chain store, an access card may be used only at a particular chain store) or local area where an access card may be used (9) Connection information on a third-party server connected to an access card (e.g., when borrowing a book with a student ID card which is an access card, to confirm a status of borrowed books of a user of the student ID card in association with a library server)

(10) Display information for an access card (e.g., including at least one of a name, image or color, hologram, logo, or text data registered by the partner terminal 101 for an access card)

The access card production page may provide an interface to edit the front and back of an access card as if it is a physical card. Information input to the card production page for the access card may be different depending on the type of the access card.

For example, information representing the user of the user terminal 104 (a name, photo, nickname, email address, affiliation, etc.) and a name of an access card may be displayed on the front of the access card. Detailed information that varies depending on the type of access card may be input to the back of the access card. When the access card is a pass, the back of an access card may include a place where a user enters with the access card, an issuance subject for an access card (a user of the user terminal 104), a validity period of the access card, and the like.

Also, detailed information on the access card may be additionally input. For example, a method of using the access card, matters to be aware of when using the access card, settings of a menu to request reissuance of the access card and a menu to request return of the access card, and the like may be additionally input by the partner terminal 101.

Figure 9:
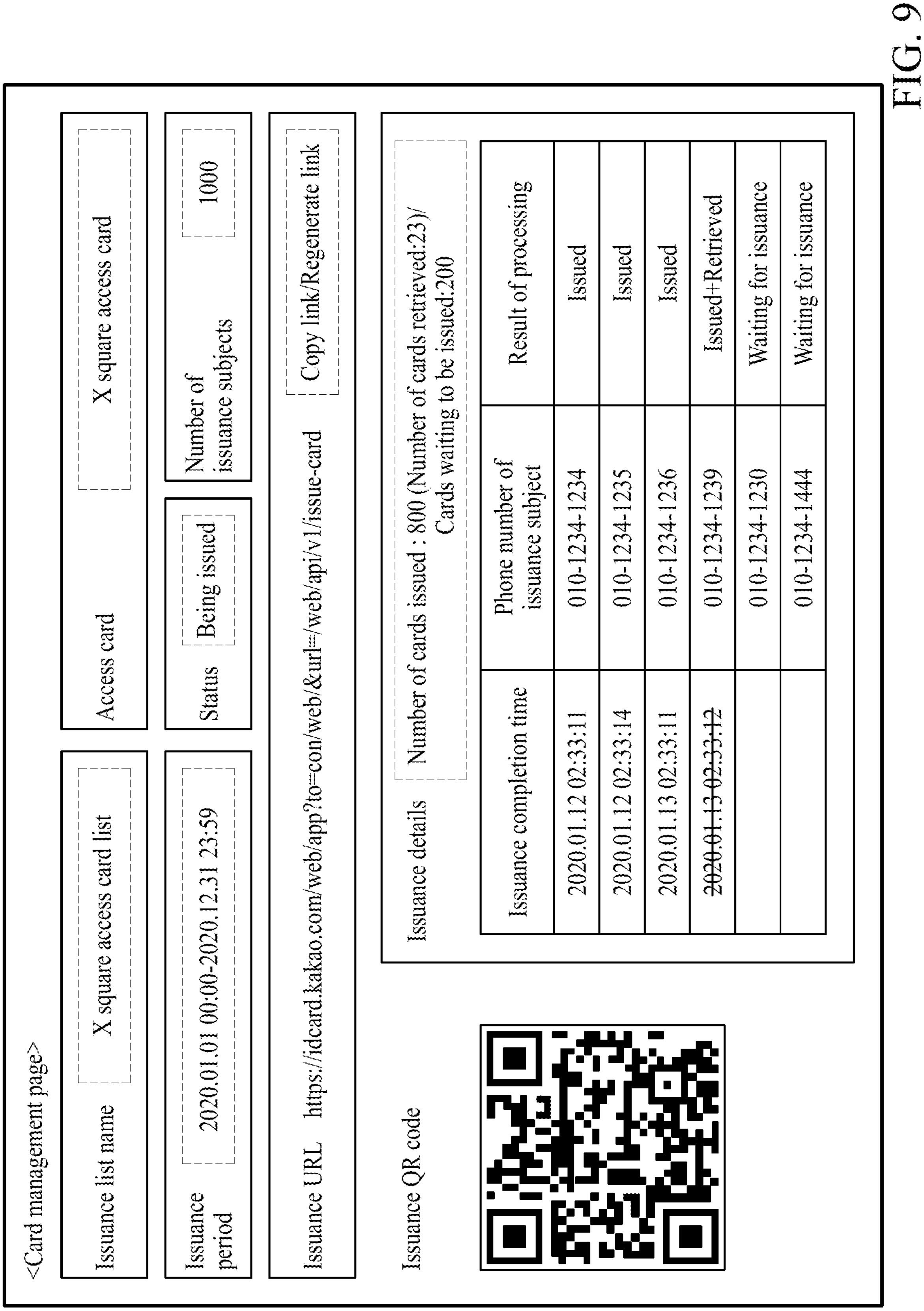
FIG. 9 is a diagram illustrating a card management page accessed by a partner terminal according to an embodiment of the present disclosure.

FIG. 9 is a diagram illustrating a card management page accessed by a partner terminal according to an embodiment of the present disclosure.

The card management page of FIG. 9 is a page accessible by the partner terminal 101, and may be set for each access card produced by the partner terminal 101.

The card management page is a page for providing information on the issuance of the access card to the partner terminal 101 after the access card is produced. The card management page may include an issuance period of the access card, an issuance link (a URL or a QR code), an issuance state of the access card, the number of issuance subjects of the access card, and issuance details of the access card.

When the issuance link is in the form of a URL, the partner terminal 101 may copy the issuance link and provide the copy to the user terminal 104 through an application. When the issuance link is a QR code, it may be provided to the partner terminal 101 so that the user terminal 104 may scan and recognize it.

When the partner terminal 101 produces N access cards, user information (e.g., a user account of an application or a phone number of the user terminal 104) may be assigned to the issuance details of the access card when the access card is issued. If the access card is not assigned to a particular user terminal 104 and is issued on the first-come, first-served basis, the user information included in the issuance details may be assigned when the access card is substantially issued to the user terminal 104 after the access card is produced.

The state of the issuance and retrieval of the access card may be confirmed through the issuance details. The number of cases waiting for the issuance of an access card may refer to the number of cases excluding the number of issued cards from the number of issuance subjects.

FIG. 10 is a diagram illustrating an example in which a user terminal accesses a card issuance page according to an embodiment of the present disclosure.

Figure 10A:
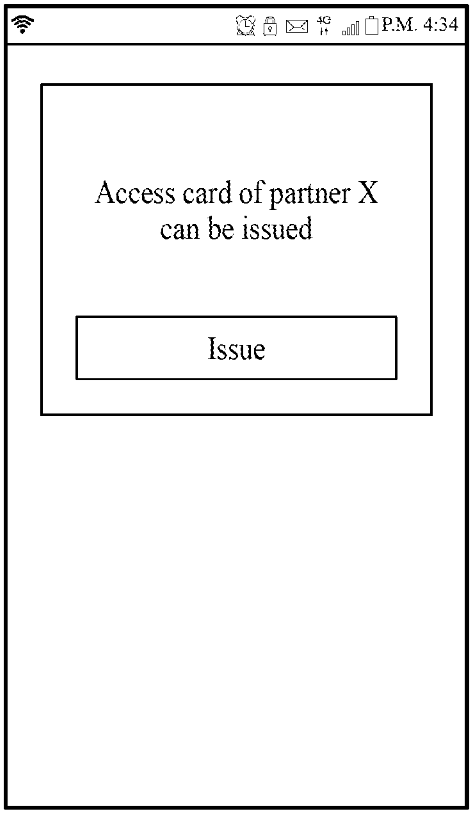
FIG. 10 is a diagram illustrating an example in which a user terminal accesses a card issuance page according to an embodiment of the present disclosure.

FIG. 10A shows a case where a link to a card issuance page of an access card, through which an access card may be issued, is transmitted through an application (e.g., a messenger application) installed on the user terminal 104. When a menu called "Issue" is selected on the user terminal 104, the user terminal 104 may access the card issuance page through the link of the card issuance page connected to the corresponding menu and transmit a request to issue an access card.

When the issuance of the access card is completed by the access card issuance server 103, an instant message including a notification that the issuance of the access card is completed may be provided to the partner terminal 101 or the user terminal 104 through a messenger application. In this case, the message may be provided through a chatroom identified as a business entity corresponding to the partner terminal 101 or a chatroom identified as a business entity corresponding to the access card issuance server 103. A chatroom identified as a business entity may be expressed by a business entity's name or icon.

Figure 10B:
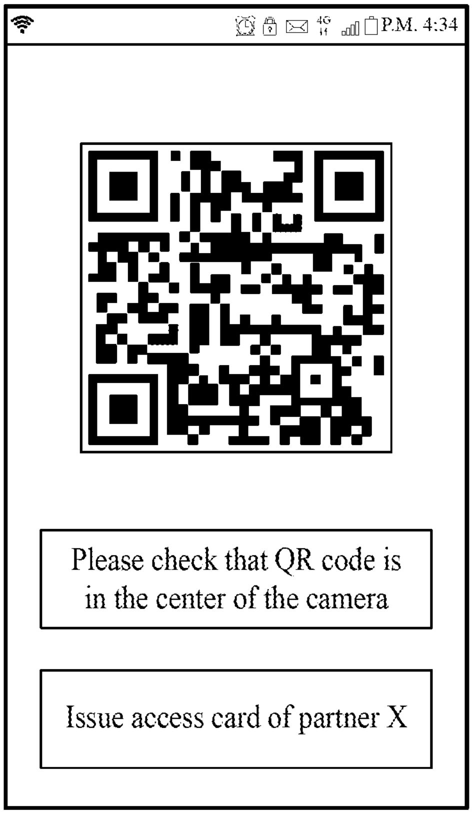

FIG. 10B shows a case of accessing the card issuance page of the user terminal 104 by recognizing a QR code displayed on the partner terminal 101 or displayed online (e.g., a web page)/offline (e.g., a kiosk, wall, or the like) through an application installed on the user terminal 104.

That is, referring to FIG. 10, the user terminal 104 may access the card issuance page provided by the access card issuance server 103 and request to issue an access card produced by the partner terminal 101 by selecting a URL or recognizing a QR code through the application.

FIG. 11 is a diagram illustrating an example in which a user terminal issues an access card through an application according to an embodiment of the present disclosure.

Figure 11A:
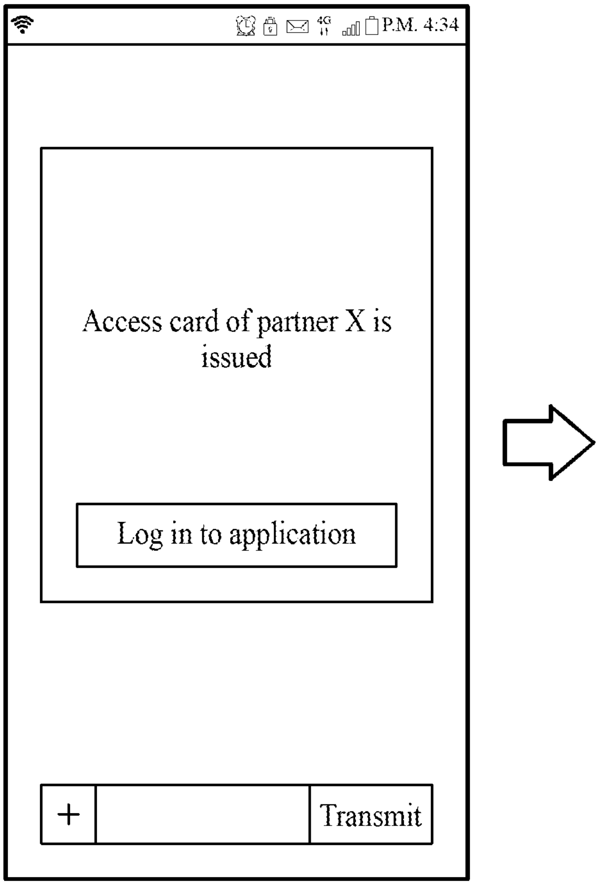
FIG. 11 is a diagram illustrating an example in which a user terminal issues an access card through an application according to an embodiment of the present disclosure.

Referring to FIG. 11A, when the access card produced by the partner terminal 101 through the access card production server 102 is generated, the user terminal 104 may request to issue the access card through the application. Also, when the access card is issued, a notification message related to the card issuance may be provided through the application.

For example, when the application is a messenger application, a message containing a content that the access card is issued may be provided to the partner terminal 101 or the user terminal 104 in a chatroom related to the partner terminal 101 or the access card issuance server 103. In this case, the user terminal 104 may confirm the access card through the application. When data for the access card is provided to the user terminal 104 through the access card issuance server 103, the user terminal 104 may display the access card using the data for the access card through the application.

Figure 11B:
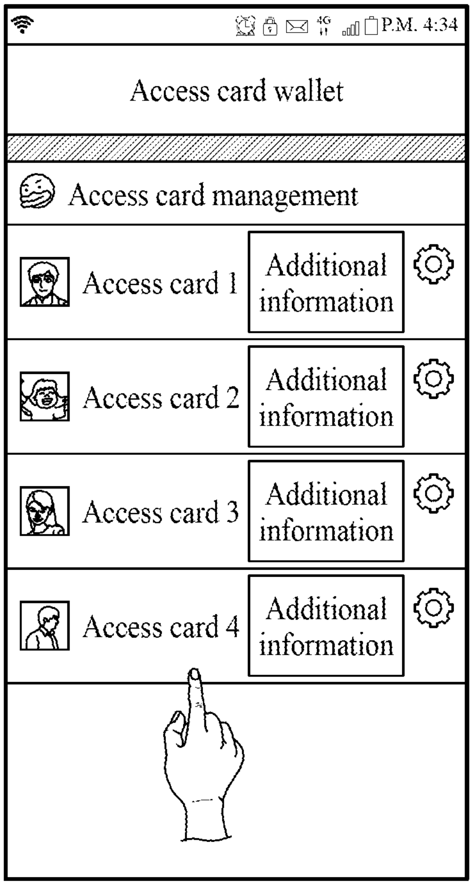

Referring to FIG. 11B, an interface in which access cards corresponding to the partner may be managed, for example, inquired, deleted, or edited may be provided in a particular function (e.g., an access card wallet) of the application installed on the user terminal 104. The user terminal 104 may receive a plurality of different types of access cards produced by different partner terminals 101 through the application. In addition, the user terminal 104 may manage the plurality of different types of access cards produced by the different partner terminals 101 through the interface shown in FIG. 11B. A list of access cards is provided through the application installed on the user terminal 104. Additional information may be assigned to each of the access cards.

For example, when an access card is generated in response to user information, additional information related to a condition for the access card to operate or for the access card to be valid may be additionally set. For example, the additional information may include time information, type information, profile information, verification information, and the like related to the access card.

The time information may refer to a start time point and an end time point for the access card to be valid. The type information may refer to information indicating whether the access card is a one-time or semi-permanent card through reissuance, information indicating whether the access card may be shared/transferred to others, or information on a method of using the access card. The profile information may be related to personal information of a user to whom the access card is issued, such as region, age, gender, affiliation, or the like. The verification information may be related to qualifications that are essential for the user to engage in online or offline activities, such as whether the user has been vaccinated, have a license, or has signed up for a membership.

FIG. 12 is a diagram illustrating an example in which a user terminal manages an access card through an application according to an embodiment of the present disclosure.

Figure 12A:
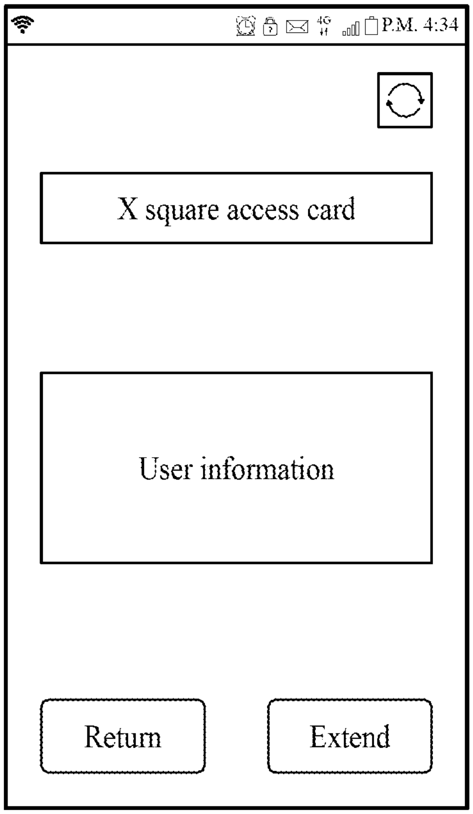
FIG. 12 is a diagram illustrating an example in which a user terminal manages an access card through an application according to an embodiment of the present disclosure.
Figure 12B:
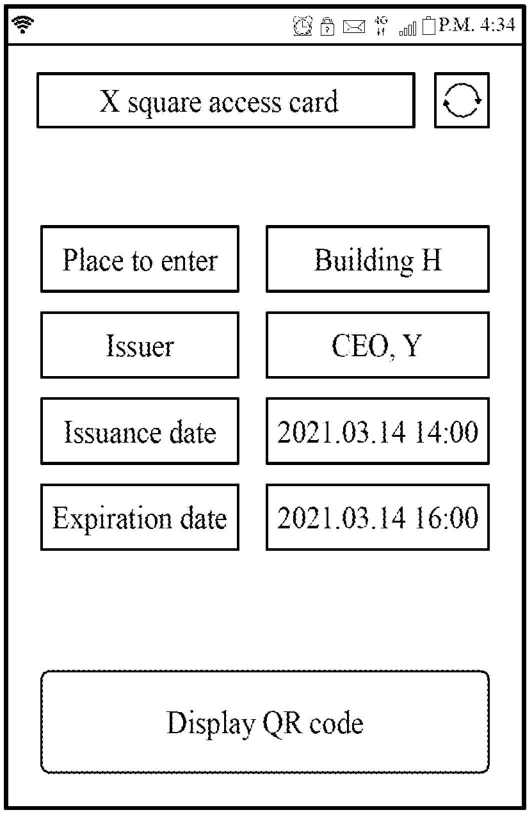

FIGS. 12A and 12B show results of the access card displayed through the application of the user terminal 104. FIG. 12A may show the front of the access card described above with reference to FIG. 8, and FIG. 12B may correspond to the back of the access card described above with reference to FIG. 8.

Referring to FIG. 12A, user information and partner information of a partner related to the issuance of the access card may be provided in the application of the user terminal 104. Also, a menu for returning and discarding the access card or extending the validity period, and the like may be provided through a display screen. The user information may refer to information for identifying a user holding the user terminal 104, such as a user's name, user's photo, user's affiliation, user's nickname, user's email address, etc.

Referring to FIG. 12B, pieces of information necessary for the use of the access card may be provided on the back of the access card. For example, as shown in a display screen shown in FIG. 12B, a validity period of the access card (an issuance date and an expiration date), a display menu of identification information corresponding to the access card (e.g., a QR code), specific information related to a partner that generated the access card (e.g., an issuer), location information where the access card may be used (e.g., a place to enter), and the like may be provided.

Figure 13:
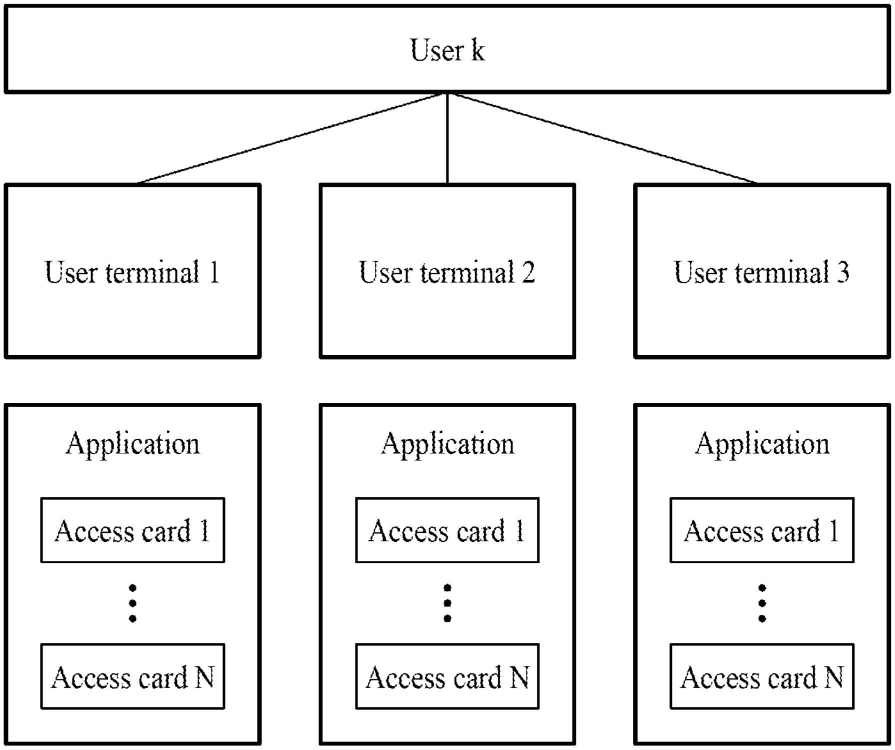
FIG. 13 is a diagram illustrating an example in which an access card is used through a plurality of user terminals according to an embodiment of the present disclosure.

FIG. 13 is a diagram illustrating an example in which an access card is used through a plurality of user terminals according to an embodiment of the present disclosure.

Referring to FIG. 13, a method of providing an access card when a user possesses a plurality of user terminals is provided. Here, the user terminals may have the same application installed. In addition, a list of access cards may be provided through the application installed on each user terminal.

For example, in each of the user terminals possessed by the same user (e.g., a user k), the same user information (e.g., user account) may be set through the application. Then, the list of access cards displayed through the application installed on each of the user terminals may also be provided in the same manner.

In another example, in each of the user terminals possessed by the same user (e.g., the user k), the same user information (e.g., user account) may be set through the application. However, the list of access cards displayed through the application installed on each of the user terminals may be provided differently for each user terminal.

For example, the list of access cards may be provided differently based on the types of the user terminals (e.g., whether it is a smartphone, a tablet personal computer (PC), or a wearable device), frequency of use of the user terminals, priority set for the user terminals, and attributes of the user terminals (a screen size, communication support method, etc.) set by a partner that generated the access cards.

Figure 14:
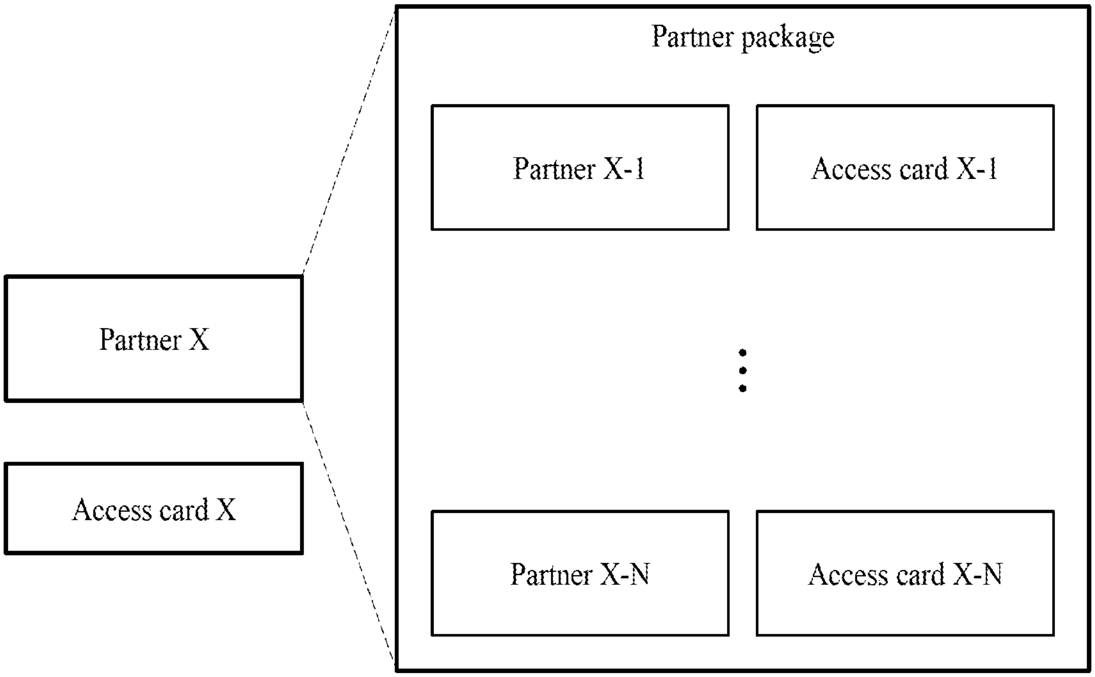
FIG. 14 is a diagram illustrating an example of generating an access card corresponding to a partner package according to an embodiment of the present disclosure.

FIG. 14 is a diagram illustrating an example of generating an access card corresponding to a partner package according to an embodiment of the present disclosure.

The partner terminal 101 that produces the access card may be associated with a partner X. At this time, when the partner X includes partners X−1 to X−N on a lower level, the partner terminal 101 may produce access cards in the unit of a package of the partners for the partner X.

For example, in a case where the partner X corresponds a particular university and the partners X−1 to X−N correspond to colleges located in the particular university, when producing an access card (e.g., a pass) of the partner X on the user terminal 104, the partner terminal 101 may also produce access cards of the partners X−1 to X−N belonging to the lower level of the partner X.

In this case, to the application installed on the user terminal 104, only information on the access card of the partner X on a higher level may be provided, or information on the access card of the partner X and the access cards of the partners X−1 to X−N belonging to the lower level of the partner X may be provided together.

In a case where the partners are structured hierarchically, when an access card of a partner on a higher level is produced, access cards of partners on a lower level may be automatically generated in the unit of a partner package. In this case, a hierarchical relationship for the partners may be input on the partner terminal 101. In addition, the access cards corresponding to the partners on the lower level may be produced independently of the access card corresponding to the partner on the higher level. For example, as shown in FIG. 8, in the card production page, information input when producing the access card corresponding to the partner on the higher level may be set differently from information input when producing the access cards corresponding to the partners on the lower level.

Figure 15:
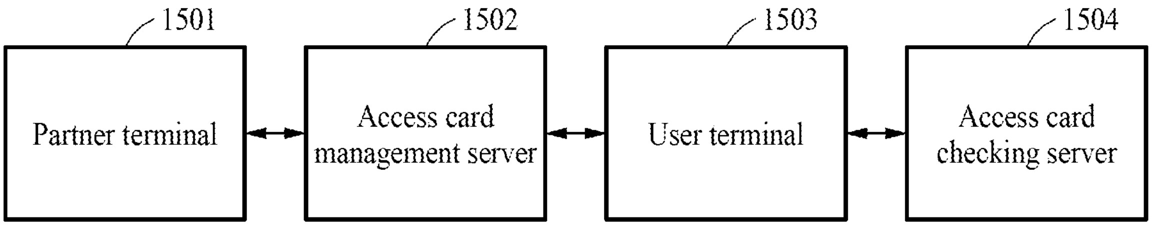
FIG. 15 is a diagram illustrating an apparatus for performing an access card checking method according to an embodiment of the present disclosure.

FIG. 15 is a diagram illustrating an apparatus for performing an access card checking method according to an embodiment of the present disclosure.

FIG. 15 illustrates a partner terminal 1501, an access card management server 1502, a user terminal 1503, and an access card checking server 1504. In a case of FIGS. 1 to 14, the situation of accessing an online or offline area using the access card has been considered, but in the description with reference to FIG. 15 and subsequent drawings, a situation of accessing an offline area will be described. In the present disclosure, the access card management server 1502 and the access card checking server 1504 may operate as independent servers or as one server.

The partner terminal 1501 may produce an access card as described with reference to FIGS. 1 and 4. Also, the user terminal 1503 may receive the access card produced by the partner terminal 1501 through an application. The access card may refer to a virtual card including information on qualifications for a user holding the user terminal 1503 to enter a particular offline space (e.g., a building) related to a partner.

After receiving the access card, the user terminal 1503 may interact with the access card checking server 1504 to enter an offline area of a partner related to the partner terminal 1501. For example, the partner terminal 1501 or the access card checking server 1504 may post identification information corresponding to the access card on a posting device (e.g., a signage, kiosk, display device, etc.) installed in an offline area such as an office, exhibition center, movie theater, concert hall, or the like. At this time, the identification information may include a code (e.g., a QR code) that may be recognized by the user terminal 1503 by scanning through a camera or the like. In another example, the identification information may be marked and displayed on a wall or facility of a building, etc., rather than an electronic device such as the posting device.

When the user terminal 1503 recognizes the identification information corresponding to the access card posted in the offline area, the access card checking server 1504 may determine whether the user terminal 1503 has received an access card related to the qualifications to enter the offline area through the access card management server 1502. A process of determining whether the user terminal 1503 has received the access card related to the qualifications to enter the offline area after the user terminal 1503 recognizes the identification information corresponding to the access card is a process of checking the access card. Here, the access card may be used to determine whether a user of the user terminal 1503 may enter the offline area related to a partner of the partner terminal 1501.

For example, even if the user terminal 1503 has received an access card related to a business entity of the partner terminal 1501, there may be no qualifications to enter a particular offline area related to the business entity of the partner terminal 1501. For example, even if a user has received an access card for Company A, when the qualifications to enter a particular space such as an office except for a conference room of Company A is not set in the access card, the user holding the user terminal 1503 may not enter the office although the user may enter the conference room of Company A.

Therefore, according to an embodiment of the present disclosure, when a result of whether the access card related to the partner terminal 1501 is issued and a result of whether the qualifications to enter an offline area to enter through the access card is set in the access card are satisfied, the user holding the user terminal 1503 may enter the offline area.

In another example, when the user terminal 1503 recognizes the identification information corresponding to the access card posted in the offline area, the access card checking server 1504 may determine whether the user terminal 1503 has received the access card related to the qualifications to enter the offline area through a direct interaction with the user terminal 1503.

According to an embodiment of the present disclosure, in order for the user holding the user terminal 1503 to validly enter the offline area related to the business entity of the partner terminal 1501, it is necessary to recognize identification information (e.g., a QR code) posted on an electronic device or in an area other than the electronic device through the user terminal 1503. In addition, when the access card related to the qualifications to enter the offline area is issued to the user terminal 1503 that recognizes the identification information, the user holding the user terminal 1503 may validly enter the offline area that may be entered through the access card.

The identification information may be generated by the access card management server 1502 or the access card checking server 1504, and posted in an offline area related to a partner that is the business entity of the partner terminal 1501 by the access card checking server 1504. The identification information posted in the offline area may be recognized by the user terminal 1503 to determine whether the user terminal 1503 possesses the access card related to the authority to enter the offline area.

According to an embodiment of the present disclosure, at least one piece of additional information of a type of an access card that the access card checking server 1504 wishes to check, authority set in the access card, a validity period for recognizing the identification information, a page that is confirmed by the user terminal 1503 after recognizing the identification information, a page that is confirmed by the user terminal 1503 not holding the access card after recognizing the identification information, whether the identification information is scanned in a duplicated manner, or a page that is confirmed by the user terminal 1503 that scans the identification information in a duplicated manner when scanning in a duplicated manner is prohibited may be set by the partner terminal 1501 or the access card management server 1502.

When the user terminal 1503 holding the access card produced by the partner terminal 1501 recognizes the identification information posted in the offline area of the partner, the access card checking server 1504 may interact with the user terminal 1503 or interact with the access card management server 1502 according to a place where the access card is stored and managed. The access card checking server 1504 may determine whether the user terminal 1503 entering the offline area of the partner holds the access card that is linked to the identification information and is related to the qualifications to validly enter the offline area of the partner.

Also, when the user terminal 1503 recognizes the identification information posted in the offline area and holds the access card linked to the identification information, it may be determined whether the user holding the user terminal 1503 is able to validly enter the offline area of the partner terminal 1501 based on at least one of a time point at which the identification information is scanned, information on the user terminal 1503 that scanned the identification information, information on the user of the user terminal 1503, or information on the access card linked to the identification information. The determination of whether the user terminal 1503 has received the access card related to the qualifications to validly enter the offline area of the partner may be performed through the partner terminal 1501, the access card management server 1502, or the access card checking server 1504.

Figure 16:
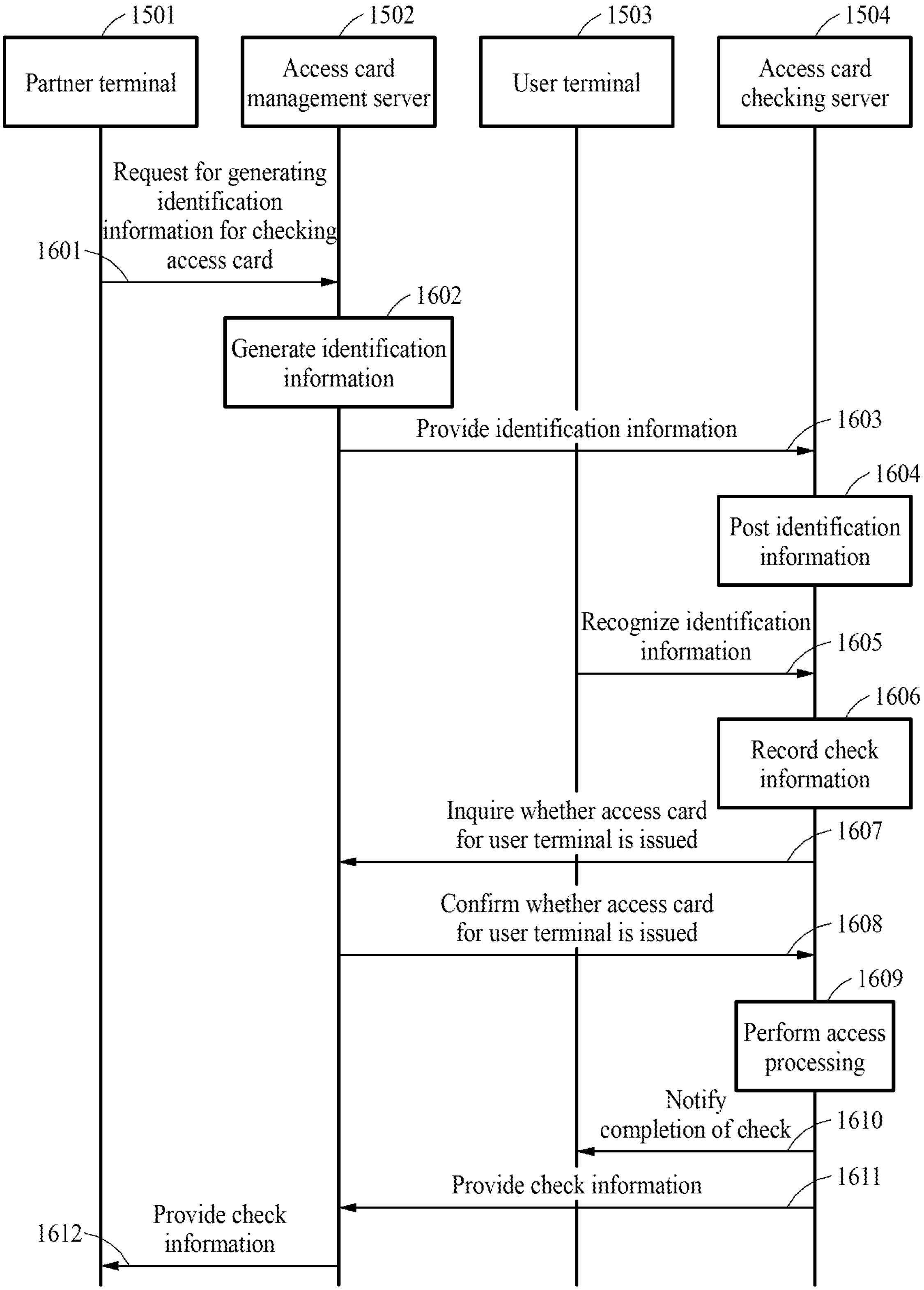
FIG. 16 is a flowchart of an access card checking method according to an embodiment of the present disclosure.

FIG. 16 is a flowchart of an access card checking method according to an embodiment of the present disclosure.

A case where the access card is stored and managed in the access card management server 1502 rather than the user terminal 1503 is considered with reference to FIG. 16. Also, FIG. 16 describes that the identification information corresponding to the access card is generated by the access card management server 1502 and posted by the access card checking server 1504. However, this is merely an example, and the following situations may be considered.

Specifically, the identification information for the access card may be generated by the access card management server 1502 or the access card checking server 1504. The identification information for the access card may be posted by the partner terminal 1501, the access card management server 1502, or the access card checking server 1504. According to an embodiment of the present disclosure, the generation and posting of the identification information for the access card may be performed by the same device or different devices.

In operation 1601, the partner terminal 1501 may transmit a request for generating identification information for checking the access card to the access card management server 1502. The access card management server 1502 may be one of the access card production server 102 or the access card issuance server 103 of FIG. 1 or the access card management server 402 of FIG. 4.

In operation 1602, the access card management server 1502 may generate the identification information corresponding to the access card in response to the request for generating the identification information received from the partner terminal 1501.

In operation 1603, the access card management server 1502 may provide the identification information corresponding to the access card to the access card checking server 1504.

In operation 1604, the access card checking server 1504 may post the identification information corresponding to the access card to the offline area related to the partner of the partner terminal 1501.

In operation 1605, the user terminal 1503 may recognize the identification information posted by the access card checking server 1504. For example, the identification information may be recognized by scanning the identification information through a camera or the like installed on the user terminal 1503.

In operation 1606, the access card checking server 1504 may record check information related to the recognition of the identification information by the user terminal 1503. The check information may include at least one of a time point at which the user terminal 1503 recognizes the identification information and requests for a check of the access card, whether the access card is repeatedly checked, information on the user terminal 1503 checked through the access card (e.g., a phone number or an ID of an application), or information on the access card requested to be checked. Operation 1606 may be performed after operation 1608.

In operation 1607, the access card checking server 1504 may inquire the access card management server 1502 whether the access card related to the qualification to enter the offline area related to the partner of the partner terminal 1501 is issued to the user terminal 1503. For example, the access card management server 1504 may inquire the access card management server 1502 whether access cards received by the user terminal 1503 include the access card related to the qualifications to enter the offline area related to the partner of the partner terminal 1501.

In operation 1608, the access card management server 1502 may transmit, to the access card checking server 1504, a result of confirming that the access card related to the qualifications to enter the offline area related to the partner of the partner terminal 1501 is issued to the user terminal 1503.

In operation 1609, when the access card related to the qualifications to enter the offline area related to the partner of the partner terminal 1501 is issued to the user terminal 1503, the access card checking server 1504 may perform access processing to allow the user holding the user terminal 1503 to enter the offline area of the partner. For example, when the user of the user terminal 1503 enters a building entrance door in the offline area, the access card checking server 1504 may release a blocker installed at the building entrance door to allow the user to enter the building.

If the access card related to the partner of the partner terminal 1501 is not issued to the user terminal 1503, or if an access card related to the partner is issued but it is not the access card related to the qualifications to enter the offline area, the access card checking server 1504 may process to block the entry of the user holding the user terminal 1503 to the offline area of the partner.

When the entry is allowed in operation 1609, in operation 1610, the access card checking server 1504 may provide, to the user terminal 1503, a notification that the user terminal 1503 has validly completed the check of the access card for the offline area related to the partner. For example, the notification that the check for the access card is completed may be provided through a chatroom identified as a business entity of the partner terminal 1501 or a chatroom identified as a business entity of the access card management server 1502. A chatroom identified as a business entity may be identified by a business entity's name or icon.

In operation 1611, when the user terminal 1503 has validly completed the check for the offline area related to the partner, the access card checking server 1504 may provide the check information to the access card management server 1502. In operation 1612, the access card management server 1502 may provide the check information to the partner terminal 1501.

Figure 17:
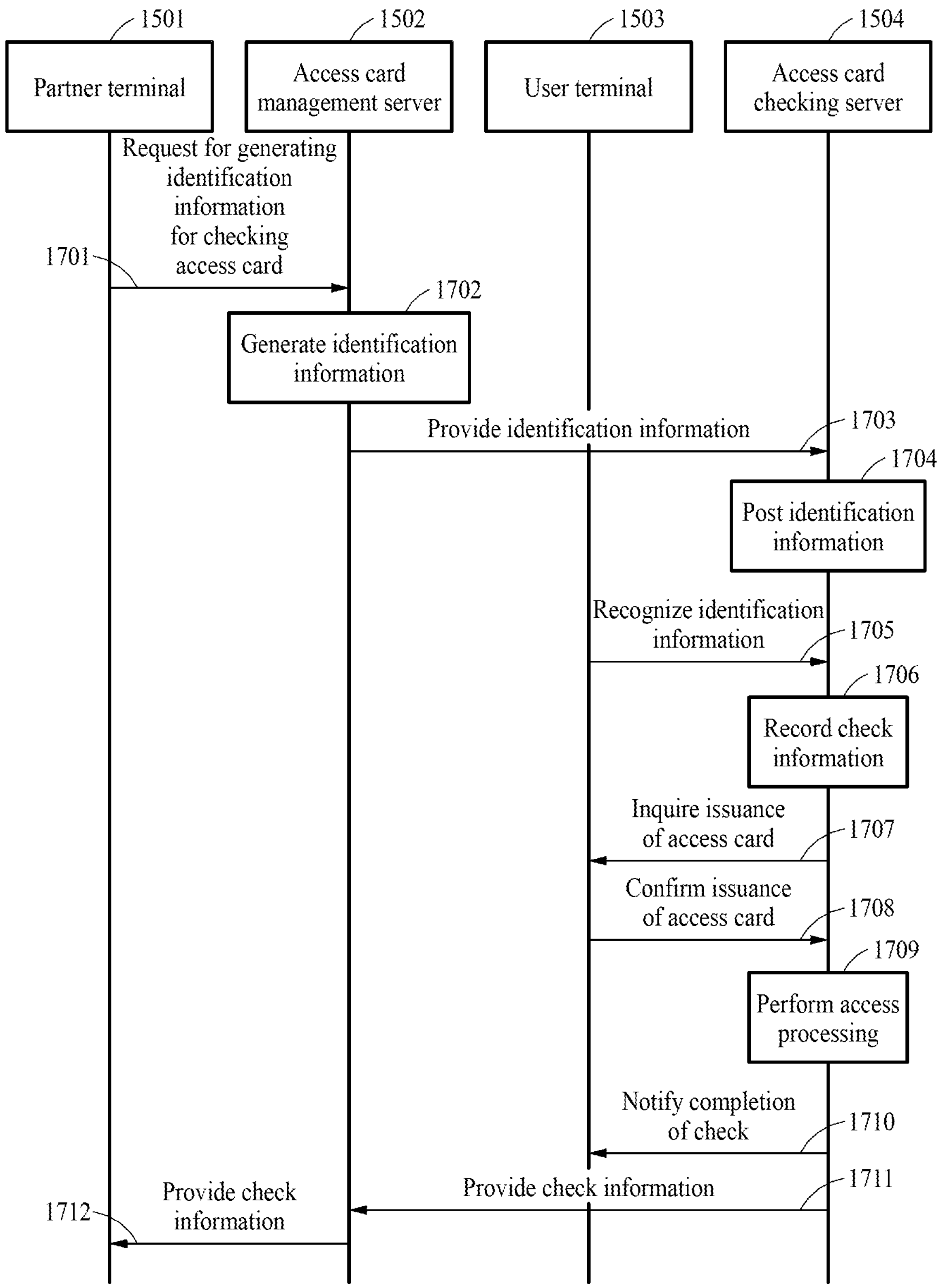
FIG. 17 is a flowchart of an access card checking method according to another embodiment of the present disclosure.

FIG. 17 is a flowchart of an access card checking method according to another embodiment of the present disclosure.

A case where the access card is downloaded and managed in the user terminal 1503 is considered with reference to FIG. 17. FIG. 17 describes that the identification information corresponding to the access card is generated by the access card management server 1502 and posted by the access card checking server 1504. However, this is merely an example, and the following situations may be considered.

Specifically, the identification information for the access card may be generated by the partner terminal 1501, the access card management server 1502, or the access card checking server 1504. The identification information for the access card may be posted by the partner terminal 1501, the access card management server 1502, or the access card checking server 1504. According to an embodiment of the present disclosure, the generation and posting of the identification information for the access card may be performed by the same device or different devices.

In operation 1701, the partner terminal 1501 may transmit a request for generating identification information for checking the access card to the access card management server 1502. The access card management server 1502 may be one of the access card production server 102 or the access card issuance server 103 of FIG. 1 or the access card management server 402 of FIG. 4.

In operation 1702, the access card management server 1502 may generate identification information corresponding to the access card in response to a request for generating the identification information received from the partner terminal 1501.

In operation 1703, the access card management server 1502 may provide the identification information corresponding to the access card to the access card checking server 1504.

In operation 1704, the access card checking server 1504 may post the identification information corresponding to the access card to the offline area related to the partner of the partner terminal 1501.

In operation 1705, the user terminal 1503 may perform the check of the access card by recognizing the identification information posted by the access card checking server 1504. For example, the identification information may be recognized by scanning the identification information through a camera or the like installed on the user terminal 1503.

In operation 1706, the access card checking server 1504 may record check information related to the recognition of the identification information by the user terminal 1503. The check information may include at least one of a time point at which the user terminal 1503 recognizes the identification information and requests for a check of the access card, whether the access card is repeatedly checked, information on the user terminal 1503 checked through the access card (e.g., a phone number or an ID of an application), or information on the access card requested to be checked. Operation 1706 may be performed after operation 1708.

In operation 1707, the access card checking server 1504 may inquire whether, among access cards stored in the user terminal 1503, the access card related to the qualifications to enter the offline area related to the partner of the partner terminal 1501 is issued. For example, the access card management server 1502 may confirm through the user terminal 1503 whether the access cards received by and stored in the user terminal 1503 include the access card related to the qualifications to enter the offline area related to the partner of the partner terminal 1501.

In operation 1708, the access card checking server 1504 may receive a result of confirming that the access card related to the qualifications to enter the offline area related to the partner of the partner terminal 1501 is issued to the user terminal 1503.

In operation 1709, when the access card related to the qualifications to enter the offline area related to the partner of the partner terminal 1501 is issued to the user terminal 1503, the access card checking server 1504 may perform access processing to allow the user holding the user terminal 1503 to enter the offline area of the partner. For example, when the user of the user terminal 1503 enters a building entrance door in the offline area, the access card checking server 1504 may release a blocker installed at the building entrance door to allow the user to enter the building.

If the access card related to the partner of the partner terminal 1501 is not issued to the user terminal 1503, or if an access card related to the partner is issued but it is not the access card related to the qualifications to enter the offline area, the access card checking server 1504 may block the entry of the user holding the user terminal 1503 to the offline area of the partner.

When the entry is allowed in operation 1709, in operation 1710, the access card checking server 1504 may provide, to the user terminal 1503, a notification that the user terminal 1503 has validly completed the check of the access card for the offline area related to the partner. For example, the notification that the check for the access card is completed may be provided through a chatroom identified as a business entity of the partner terminal 1501 or a chatroom identified as a business entity of the access card management server 1502. A chatroom identified as a business entity may be identified by a business entity's name or icon.

In operation 1711, when the user terminal 1503 has validly completed the check for the offline area related to the partner, the access card checking server 1504 may provide the check information to the access card management server 1502. In operation 1712, the access card management server 1502 may provide the check information to the partner terminal 1501.

Figure 18:
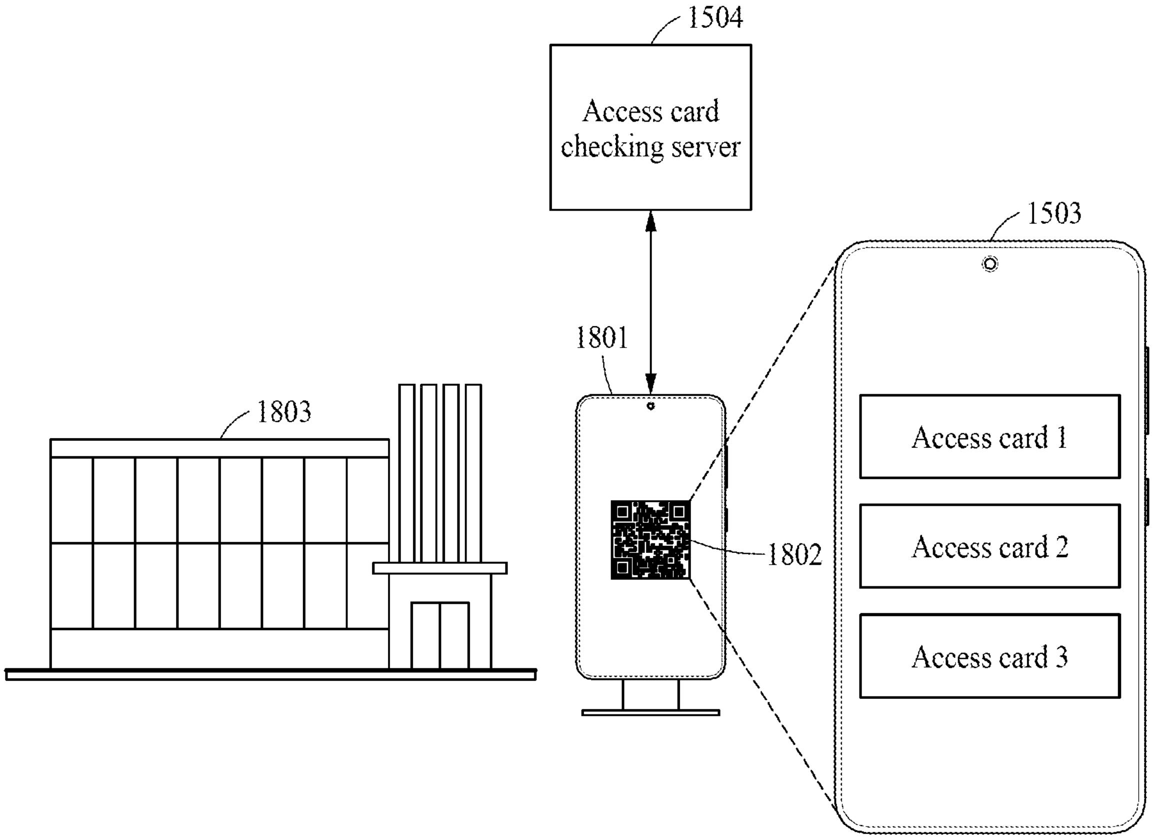
FIG. 18 is a diagram illustrating an example related to offline building access to which an access card checking method according to an embodiment of the present disclosure is applied.

FIG. 18 is a diagram illustrating an example related to offline building access to which an access card checking method according to an embodiment of the present disclosure is applied.

Referring to FIG. 18, the user of the user terminal 1503 wishes to enter a building 1803, which is the offline area of the partner (business entity) of the partner terminal 1501. At this time, in order for the user to pass through an entrance door of the building 1803, identification information 1802 for confirming the qualifications to validly enter the building 1803 may be posted on a kiosk 1801 disposed near the entrance of the building 1803.

The user terminal 1503 may recognize the identification information 1802 that allows the entry into the building 1803, which is the offline area of the partner. The user terminal 1503 may recognize the identification information 1802 corresponding to the access card through a camera to check the access card.

Then, the access card checking server 1504 connected to the kiosk 1801 may determine whether, among access cards received by the user terminal 1503, an access card related to the qualifications to enter the building 1803 is validly issued.

The access card checking server 1504 connected to the kiosk 1801 may confirm whether the user of the user terminal 1503 that wishes to pass through the entrance door of the building 1803 validly receives and maintains the access card related to the qualifications to validly enter the building 1803 which is the offline area of the partner. For example, when the access card is stored in and managed by the access card management server 1502, as shown in FIG. 16, the access card checking server 1504 may interact with the access card management server 1502 to confirm whether the access card related to the qualification to validly enter the offline area related to the business entity of the partner terminal 1501 is issued. When the access card is stored in and managed by the user terminal 1503, as shown in FIG. 17, the access card checking server 1504 may interact with the user terminal 1503 to confirm whether the access card related to the qualification to validly enter the offline area related to the business entity of the partner terminal 1501 is issued.

For example, the user terminal 1503 may search for and display the access card required to enter the building 1803. When the user terminal 1503 recognizes the identification information 1802, conditions for searching for the access card (e.g., a name of the access card, type of the access card, information on the partner that produced the access card, etc.) may be identified. At this time, when an access card 1 is an access card required to enter the building 1803, the user terminal 1503 may provide, to the access card checking server 1504, information on the access card 1 among issued access cards 1 to 3.

In another example, the access card checking server 1504 may search for and extract information on the access card required to enter the building 1803 from the user terminal 1503. At this time, when the access card 1 is the access card required for the user of the user terminal 1503 to enter the building 1803, the access card checking server 1504 may directly search for and extract the information on the access card 1 among the issued access cards 1 to 3 issued for the user terminal 1503.

When the user of the user terminal 1503 has validly received or holds the access card 1 related to the qualifications to validly enter the building 1803 (when the check for the access card is completed), the user of the user terminal 1503 may pass through and enter the entrance door of the building 1803 related to the partner that produced the access card. In addition, a notification of entering the building 1803 is transmitted to the partner terminal 1501, and the check information for the access card of the user terminal 1503 may also be transmitted.

The method according to embodiments may be written in a computer-executable program and may be implemented as various recording media such as magnetic storage media, optical reading media, or digital storage media.

Various techniques described herein may be implemented in digital electronic circuitry, computer hardware, firmware, software, or combinations thereof. The implementations may be achieved as a computer program product, i.e., a computer program tangibly embodied in an information carrier, e.g., in a machine-readable storage device (for example, a computer-readable medium) or in a propagated signal, for processing by, or to control an operation of, a data processing apparatus, e.g., a programmable processor, a computer, or multiple computers. A computer program, such as the computer program(s) described above, may be written in any form of a programming language, including compiled or interpreted languages, and may be deployed in any form, including as a stand-alone program or as a module, a component, a subroutine, or other units suitable for use in a computing environment. A computer program may be deployed to be processed on one computer or multiple computers at one site or distributed across multiple sites and interconnected by a communication network.

Processors suitable for processing of a computer program include, by way of example, both general and special purpose microprocessors, and any one or more processors of any kind of digital computer. Generally, a processor will receive instructions and data from a read-only memory or a random-access memory, or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Examples of information carriers suitable for embodying computer program instructions and data include semiconductor memory devices, e.g., magnetic media such as hard disks, floppy disks, and magnetic tape, optical media such as compact disk read only memory (CD-ROM) or digital video disks (DVDs), magneto-optical media such as floptical disks, read-only memory (ROM), random-access memory (RAM), flash memory, erasable programmable ROM (EPROM), or electrically erasable programmable ROM (EEPROM). The processor and the memory may be supplemented by, or incorporated in special purpose logic circuitry.

In addition, non-transitory computer-readable media may be any available media that may be accessed by a computer and may include both computer storage media and transmission media.

Although the present specification includes details of a plurality of specific embodiments, the details should not be construed as limiting any disclosure or a scope that can be claimed, but rather should be construed as being descriptions of features that may be peculiar to specific embodiments of specific disclosures. Specific features described in the present specification in the context of individual embodiments may be combined and implemented in a single embodiment. On the contrary, various features described in the context of a single embodiment may be implemented in a plurality of embodiments individually or in any appropriate sub-combination. Furthermore, although features may operate in a specific combination and may be initially depicted as being claimed, one or more features of a claimed combination may be excluded from the combination in some cases, and the claimed combination may be changed into a sub-combination or a modification of the sub-combination.

Likewise, although operations are depicted in a specific order in the drawings, it should not be understood that the operations must be performed in the depicted specific order or sequential order or all the shown operations must be performed in order to obtain a preferred result. In specific cases, multitasking and parallel processing may be advantageous. In addition, it should not be understood that the separation of various device components of the aforementioned embodiments is required for all the embodiments, and it should be understood that the aforementioned program components and apparatuses may be integrated into a single software product or packaged into multiple software products.

The embodiments disclosed in the present specification and the drawings are intended merely to present specific examples in order to aid in understanding of the disclosure, but are not intended to limit the scope of the disclosure. It will be apparent to those skilled in the art that various modifications based on the technical spirit of the present disclosure, as well as the disclosed embodiments, can be made.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An access card providing method performed by an access card management server, the access card providing method comprising:

receiving card information for producing an access card from a partner terminal, wherein the card information includes application identification information of an entity corresponding to the partner terminal;

producing the access card based on the received card information;

providing, through a chatroom identified as the entity corresponding to the partner terminal or an access card production server of a messenger application installed on a user terminal, a link or a code to a card issuance page for the access card;

receiving an issuance request for the access card of the user terminal through the link or the code; and providing data for the produced access card in response to the issuance request for the access card, wherein the access card is a virtual card indicating qualifications to enter an online area or an offline area set by the partner terminal, wherein the user terminal is configured to receive different types of access cards produced by different partner terminals, and wherein the provided data is stored in association with a user account of the messenger application, such that the different types of access cards produced by the different partner terminals are issued, displayed, and managed through the messenger application installed on the user terminal.

2. The access card providing method of claim 1, wherein the access card is assigned with user information of a user terminal designated by the partner terminal, and wherein the user information comprises a phone number of the user terminal or a user account of the user terminal.

3. The access card providing method of claim 1, wherein the access card is assigned with user information related to a user terminal, for which issuance is requested within a number of access cards that are able to be issued, designated by the partner terminal, and wherein the user information comprises a phone number of the user terminal or a user account of the user terminal.

4. The access card providing method of claim 1, wherein the access card has set validity conditions, and wherein the validity conditions comprises at least one of time information, type information, profile information, or verification information related to the access card.

5. The access card providing method of claim 1, wherein, when a partner corresponding to the partner terminal that produces the access card is expanded according to a hierarchical structure, the access card is generated based on the hierarchical structure.

6. The access card providing method of claim 1, wherein an instant message related to production of the access card comprises (i) an instant message comprising a notification that the production of the access card is completed or (ii) an instant message comprising information on the access card, and wherein the instant message is provided to the partner terminal through a chatroom identified as a business entity corresponding to the partner terminal or an access card production server.

7. The access card providing method of claim 1, wherein an instant message related to issuance of the access card comprises an instant message comprising a notification that the issuance of the access card is completed, and wherein the instant message is provided to the partner terminal or the user terminal through a chatroom identified as a business entity corresponding to the partner terminal or an access card issuance server.

8. An access card checking method performed by an access card management server, the access card checking method comprising:

providing identification information corresponding to an access card to the access card checking server, wherein the identification information includes application identification information of a business entity corresponding to a partner terminal used to create the access card;

receiving, from the access card checking server, an inquiry whether the access card is issued for a user terminal that recognizes the identification information;

confirming whether the access card corresponding to the identification information is issued; and transmitting, to the access card checking server, a result of confirming whether the access card for the user terminal is issued, wherein the identification information is provided by the access card checking server, posted in an offline area related to a partner that is the business entity of the partner terminal for entry to the offline area, wherein the access card is a virtual card indicating qualifications to enter the offline area, and is issued, displayed, and managed through the messenger application installed on the user terminal using a chatroom identified as the business entity corresponding to the partner terminal or an access card production server, wherein data regarding the access card is stored in association with a user account of the messenger application, such that the different types of access cards produced by the different partner terminals are issued, displayed, and managed through the messenger application installed on the user terminal.

9. The access card checking method of claim 8, wherein access processing for the access card is performed according to (i) whether the user terminal has validly received the access card, or (ii) whether the access card issued for the user terminal satisfies validity conditions.

10. The access card checking method of claim 9, wherein whether the user terminal has validly received the access card is determined according to whether at least one of access cards issued for the user terminal includes an access card related to qualifications to enter the offline area.

11. The access card checking method of claim 8, further comprising:

setting additional information comprising at least one of a type of the access card, authority set in the access card, a validity period for recognizing the identification information, a page that is confirmed by a user terminal after recognizing the identification information, a page that is confirmed by a user terminal not holding an access card after recognizing the identification information, whether the identification information is scanned in a duplicated manner, or a page that is confirmed by a user terminal that scans the identification information in a duplicated manner when scanning in a duplicated manner is prohibited.

12. The access card checking method of claim 8, wherein a message comprising a notification related to completion of checking for the access card is provided through a chatroom, and wherein the chatroom is identified as a business entity of the partner terminal or the access card management server.

13. The access card checking method of claim 8, further comprising:

providing check information for the access card to the partner terminal.

14. The access card checking method of claim 8, wherein the check information comprises at least one of a time point at which the user terminal recognizes the identification information and requests to check the access card, whether the access card is checked in a duplicated manner, user information for the user terminal checked through the access card, or information on the access card that is requested to be checked.

15. An access card checking method performed by an access card checking server, the access card checking method comprising:

recording check information related to recognition of identification information corresponding to an access card of a user terminal, wherein the identification information includes application identification information of a business entity corresponding to a partner terminal used to produce the access card;

transmitting, to an access card management server, an inquiry whether the access card is issued for the user terminal that recognizes the identification information;

receiving, from the access card management server, a result of confirming whether the access card is issued based on the identification information; and performing access processing based on the result of confirming, wherein the identification information is provided by the access card checking server and posted in an offline area related to a partner that is the business entity of the partner terminal to enter the offline area, wherein the access card is a virtual card indicating qualifications to enter the offline area, and is issued, displayed, and managed through a messenger application installed on the user terminal using a chatroom identified as the business entity corresponding to the partner terminal or an access card production server, and wherein the provided data is stored in association with a user account of the messenger application, such that the different types of access cards produced by the different partner terminals are issued, displayed, and managed through the messenger application installed on the user terminal.

16. The access card checking method of claim 15, wherein the performing of the access processing comprises:

performing the access processing according to (i) whether the user terminal has validly received the access card, or (ii) whether the access card issued for the user terminal satisfies validity conditions.

17. The access card checking method of claim 16, wherein whether the user terminal has validly received the access card is determined according to whether at least one of access cards issued for the user terminal includes an access card related to qualifications to enter the offline area.

18. The access card checking method of claim 15, wherein a message comprising a notification related to completion of checking for the access card is provided through a chatroom, and wherein the chatroom is identified as a business entity of the partner terminal or the access card management server.

19. The access card checking method of claim 15, further comprising:

providing check information for the access card to the access card management server.

20. The access card checking method of claim 15, wherein the check information comprises at least one of a time point at which the user terminal recognizes the identification information and requests to check the access card, whether the access card is checked in a duplicated manner, information on the user terminal, or information on the access card requested to be checked.

* * * * *